(12) United States Patent
Dutta et al.

(10) Patent No.: US 12,739,706 B2
(45) Date of Patent: Sep. 15, 2026

(54) COORDINATED LONG-TERM EVOLUTION (LTE) AND NEW RADIO (NR) COEXISTENCE IN VEHICLE-TO-EVERYTHING (V2X) NETWORK

(71) Applicant: QUALCOMM Incorporated, San Diego, CA (US)

(72) Inventors: Sourjya Dutta, San Diego, CA (US); Tien Viet Nguyen, Bridgewater, NJ (US); Hui Guo, Beijing (CN); Gabi Sarkis, San Diego, CA (US); Kapil Gulati, Belle Mead, NJ (US)

(73) Assignee: Qualcomm Incorporated, San Diego, CA (US)

( * ) Notice: Subject to any disclaimer, the term of this patent is extended or adjusted under 35 U.S.C. 154(b) by 288 days.

(21) Appl. No.: 18/685,840

(22) PCT Filed: Oct. 29, 2021

(86) PCT No.: PCT/CN2021/127340

§ 371 (c)(1),
(2) Date: Feb. 22, 2024

(87) PCT Pub. No.: WO2023/070506

PCT Pub. Date: May 4, 2023

(65) Prior Publication Data

US 2024/0357430 A1 Oct. 24, 2024

(51) Int. Cl.
*H04W 28/20* (2009.01)
*H04W 72/25* (2023.01)
(Continued)

(52) U.S. Cl.
CPC ........... *H04W 28/20* (2013.01); *H04W 72/25* (2023.01); *H04W 76/14* (2018.02); *H04W 76/15* (2018.02)

(58) Field of Classification Search
None
See application file for complete search history.

(56) References Cited

U.S. PATENT DOCUMENTS 11,698,644 B2 * 7/2023 Jornod .................... G08G 1/22 701/25
11,751,077 B2 * 9/2023 Jornod ................. H04W 4/029 370/252

(Continued)

FOREIGN PATENT DOCUMENTS

CN 110892765 A 3/2020
CN 113383504 A 9/2021

(Continued)

OTHER PUBLICATIONS

International Search Report and Written Opinion—PCT/CN2021/127340—ISA/EPO—Jun. 6, 2022.

*Primary Examiner* — Kodzovi Acolatse
(74) *Attorney, Agent, or Firm* — Loza & Loza LLP

(57) ABSTRACT

A user equipment (UE) can transmit first radio access information indicating a first ratio of first sidelink devices configured to use a first radio access technology (RAT) to second sidelink devices configured to use a second RAT. The UE can receive second radio access information from one or more sidelink devices of at least one of the first sidelink devices or the second sidelink devices. Each second radio access information indicates a respective second ratio of the first sidelink devices configured to use the first RAT to the second sidelink devices configured to use the second RAT. The UE can select a resource pool frame structure based on the first ratio and each of the respective second ratios, and the resource pool frame structure is configured to partition a resource pool between the first RAT and the second RAT for sidelink communication in a sidelink network.

30 Claims, 14 Drawing Sheets

(51) Int. Cl.
*H04W 76/14* (2018.01)
*H04W 76/15* (2018.01)

(56) References Cited

U.S. PATENT DOCUMENTS

| | | | | |
|---|---|---|---|---|
| 2017/0032402 | A1* | 2/2017 | Patsiokas | G06Q 30/0207 |
| 2019/0029002 | A1* | 1/2019 | Kotzer | H04L 67/12 |
| 2019/0274121 | A1 | 9/2019 | Wu et al. | |
| 2020/0160694 | A1* | 5/2020 | Jornod | G08G 1/0141 |
| 2020/0374956 | A1* | 11/2020 | Zhu | H04W 28/10 |
| 2021/0167933 | A1* | 6/2021 | Sambale | H04W 72/30 |
| 2021/0297881 | A1* | 9/2021 | Jornod | H04W 24/08 |
| 2023/0136374 | A1* | 5/2023 | Zeiynali Farid | G08G 1/096741 701/119 |
| 2023/0139778 | A1* | 5/2023 | Wang | H04L 1/0067 370/329 |
| 2023/0353984 | A1* | 11/2023 | Iun | H04W 4/023 |

FOREIGN PATENT DOCUMENTS

| | | | | |
|---|---|---|---|---|
| WO | 2021082004 | A1 | 5/2021 | |
| WO | WO-2022097869 | A1 * | 5/2022 | H04W 4/40 |

* cited by examiner

FIG. 6
600
Partitioned Resource Pool
602
NR V2X normal slot
604
NR V2X slot with PSFCH
606
LTE V2X slot

COORDINATED LONG-TERM EVOLUTION (LTE) AND NEW RADIO (NR) COEXISTENCE IN VEHICLE-TO-EVERYTHING (V2X) NETWORK

CROSS-REFERENCE TO RELATED APPLICATION(S)

This application is the U.S. national stage of PCT patent application number PCT/CN2021/127340 filed on Oct. 29, 2021.

TECHNICAL FIELD

The technology discussed below relates generally to wireless communication systems, and more particularly, to techniques for coordinated Long-Term Evolution (LTE) and New Radio (NR) coexistence in a vehicle-to-everything (V2X) network.

INTRODUCTION

Wireless communication between devices may be facilitated by various network configurations. In one configuration, a cellular network may enable user equipment (UEs) to communicate with one another through signaling with a nearby base station or cell. Another wireless communication network configuration is a device-to-device (D2D) network in which UEs may signal one another directly, rather than via an intermediary base station or cell. For example, D2D communication networks may utilize sidelink signaling to facilitate the direct communication between UEs over a proximity service (ProSe) PC5 interface. In some sidelink network configurations, UEs may further communicate in a cellular network, generally under the control of a base station. Thus, the UEs may be configured for uplink and downlink signaling via a base station and further for sidelink signaling directly between the UEs without transmissions passing through the base station.

One example of a sidelink wireless communication network is a vehicle-to-everything (V2X) communication network. V2X communication involves the exchange of information not only between vehicles themselves, but also between vehicles and external systems, such as streetlights, buildings, pedestrians, and cellular communication networks. In some examples, V2X devices may be configured to use Long-Term Evolution (LTE) and/or 5G New Radio (NR) radio access technologies. LTE V2X devices and NR V2X devices can coexist in the same V2X network by sharing V2X resources.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

One aspect of the disclosure provides a user equipment (UE) for wireless communication. The UE includes a transceiver, a memory, and a processor coupled to the memory and the transceiver. The processor and the memory are configured to transmit first radio access information indicating a first ratio of first sidelink devices configured to use a first radio access technology (RAT) to second sidelink devices configured to use a second RAT. The processor and the memory are further configured to receive, from one or more sidelink devices of at least one of the first sidelink devices or the second sidelink devices, second radio access information, each indicating a respective second ratio of the first sidelink devices configured to use the first RAT to the second sidelink devices configured to use the second RAT. The processor and the memory are further configured to select a resource pool frame structure based on the first ratio and each of the respective second ratios, the resource pool frame structure configured to partition a resource pool between the first RAT and the second RAT for sidelink communication in a sidelink network.

Another aspect of the disclosure provides a method for wireless communication at a user equipment (UE). The method includes transmitting first radio access information indicating a first ratio of first sidelink devices configured to use a first radio access technology (RAT) to second sidelink devices configured to use a second RAT. The method further includes receiving, from one or more sidelink devices of at least one of the first sidelink devices or the second sidelink devices, second radio access information, each indicating a respective second ratio of the first sidelink devices configured to use the first RAT to the second sidelink devices configured to use the second RAT. The method further includes selecting a resource pool frame structure based on the first ratio and each of the respective second ratios, the resource pool frame structure configured to partition a resource pool between the first RAT and the second RAT for sidelink communication in a sidelink network.

Another aspect of the disclosure provides a UE for wireless communication. The UE includes means for transmitting first radio access information indicating a first ratio of first sidelink devices configured to use a first radio access technology (RAT) to second sidelink devices configured to use a second RAT. The UE further includes means for receiving, from one or more sidelink devices of at least one of the first sidelink devices or the second sidelink devices, second radio access information, each indicating a respective second ratio of the first sidelink devices configured to use the first RAT to the second sidelink devices configured to use the second RAT. The UE further includes means for selecting a resource pool frame structure based on the first ratio and each of the respective second ratios, the resource pool frame structure configured to partition a resource pool between the first RAT and the second RAT for sidelink communication in a sidelink network.

Another aspect of the disclosure provides a computer-readable storage medium storing computer executable code. The executable code includes instructions causing a user equipment (UE) to transmit first radio access information indicating a first ratio of first sidelink devices configured to use a first radio access technology (RAT) to second sidelink devices configured to use a second RAT. The instructions further cause the UE to receive, from one or more sidelink devices of at least one of the first sidelink devices or the second sidelink devices, second radio access information, each indicating a respective second ratio of the first sidelink devices configured to use the first RAT to the second sidelink devices configured to use the second RAT. The instructions further cause the UE to select a resource pool frame structure based on the first ratio and each of the respective second ratios, the resource pool frame structure configured to partition a resource pool between the first RAT and the second RAT for sidelink communication in a sidelink network.

These and other aspects of the invention will become more fully understood upon a review of the detailed description, which follows. Other aspects, features, and implementations will become apparent to those of ordinary skill in the art, upon reviewing the following description of specific, exemplary implementations in conjunction with the accompanying figures. While features may be discussed relative to certain implementations and figures below, all implementations can include one or more of the advantageous features discussed herein. In other words, while one or more implementations may be discussed as having certain advantageous features, one or more of such features may also be used in accordance with the various implementations discussed herein. In a similar fashion, while exemplary implementations may be discussed below as devices, systems, or methods, it should be understood that such exemplary implementations can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Various aspects relate to vehicle-to-everything (V2X) communication and coexistence between V2X devices using different radio access technologies (RATs), for example, Long-Term Evolution (LTE) and 5G New Radio (NR). In some aspects, NR V2X devices can facilitate LTE-NR coexistence by using a unified NR penetration rate to reduce the mismatch of NR penetration rates between V2X devices in different regions.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described implementations. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Figure 1:
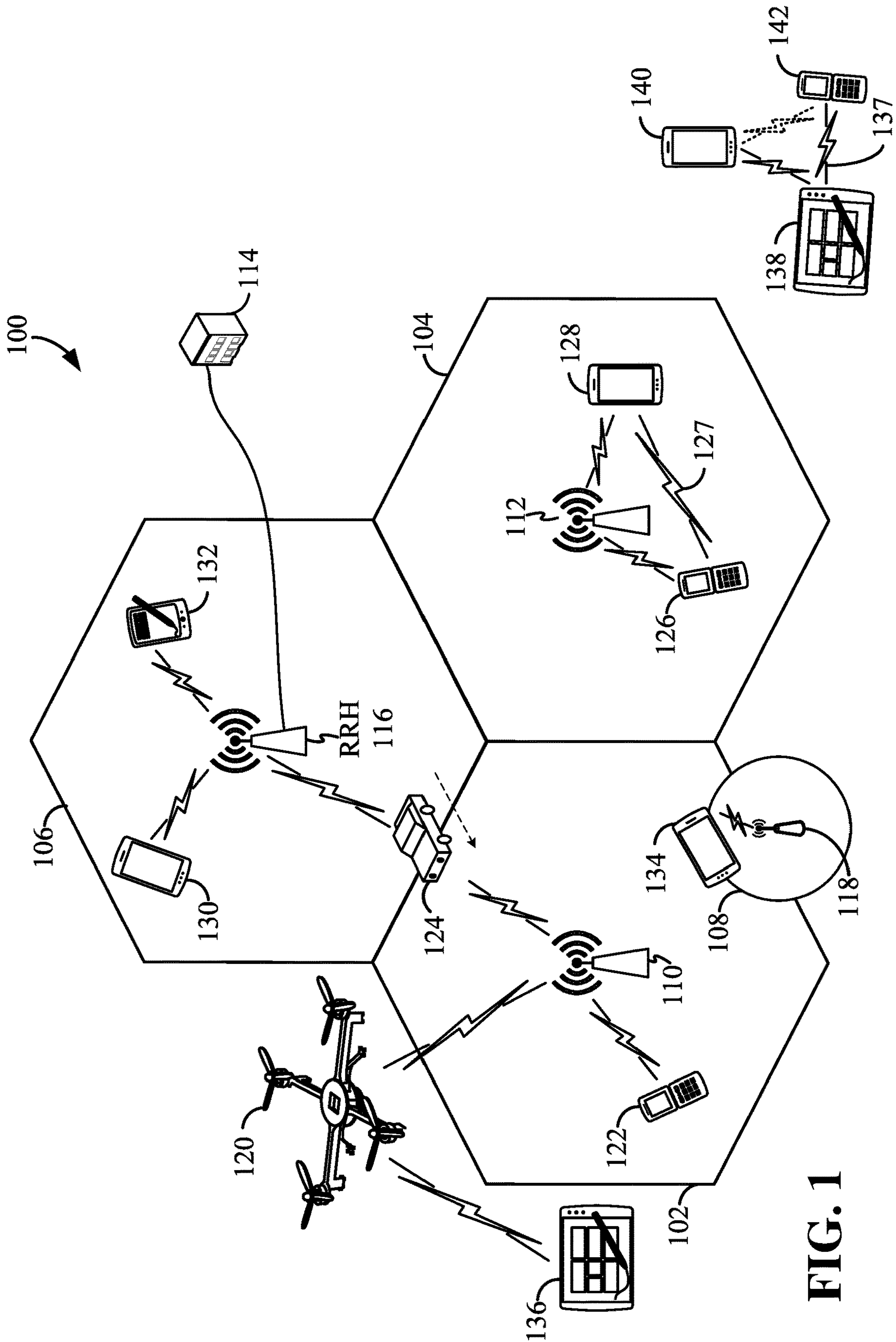
FIG. 1 is a conceptual illustration of an example of a radio access network according to some aspects.

The various concepts presented throughout this disclosure may be implemented across a broad variety of telecommunication systems, network architectures, and communication standards. Referring now to FIG. 1, as an illustrative example without limitation, a schematic illustration of a RAN 100 is provided. The RAN 100 may implement any suitable wireless communication technology or technologies to provide radio access. As one example, the RAN 100 may operate according to 3$^{rd}$ Generation Partnership Project (3GPP) New Radio (NR) specifications, often referred to as 5G. As another example, the RAN 100 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

The geographic area covered by the RAN 100 may be divided into cellular regions (cells) that can be uniquely identified by a user equipment (UE) based on an identification broadcasted from one access point or base station. FIG. 1 illustrates macrocells 102, 104, and 106, and a small cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 100 operates according to both the LTE and 5G NR standards, one of the base stations may be an LTE base station, while another base station may be a 5G NR base station. In some examples, a base station can support both LTE and 5G NR.

Various base station arrangements can be utilized. For example, in FIG. 1, two base stations 110 and 112 are shown in cells 102 and 104; and a third base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the base stations 110, 112, and 114 support cells having a large size. Further, a base station 118 is shown in cell 108 why may overlap with one or more macrocells. In this example, the cell may be referred to as a small cell (e.g., a microcell, picocell, femtocell, home base station, home Node B, home eNode B, etc.), as the base station 118 supports a cell having a relatively small size. Cell sizing can be done according to system design as well as component constraints.

It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes an unmanned aerial vehicle (UAV) 120, which may be a quadcopter or drone. The UAV 120 may be configured to function as a base station, or more specifically as a mobile base station. That is, in some examples, a cell may not necessarily be stationary, and the geographic area of the cell may move according to the location of a mobile base station such as the UAV 120.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The RAN 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quadcopter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with base station 118; and UE 136 may be in communication with mobile base station 120. Here, each base station 110, 112, 114, 118, and 120 may be configured to provide an access point to a core network (not shown) for all the UEs in the respective cells. In some examples, the UAV 120 (e.g., the quadcopter) can be a mobile network node and may be configured to function as a UE. For example, the UAV 120 may operate within cell 102 by communicating with base station 110.

Wireless communication between a RAN 100 and a UE (e.g., UE 122 or 124) may be described as utilizing an air interface. Transmissions over the air interface from a base station (e.g., base station 110) to one or more UEs (e.g., UE 122 and 124) may be referred to as downlink (DL) transmission. In accordance with certain aspects of the present disclosure, the term downlink may refer to a point-to-multipoint transmission originating at a scheduling entity (described further below; e.g., base station 110). Another way to describe this scheme may be to use the term broadcast channel multiplexing. Transmissions from a UE (e.g., UE 122) to a base station (e.g., base station 110) may be referred to as uplink (UL) transmissions. In accordance with further aspects of the present disclosure, the term uplink may refer to a point-to-point transmission originating at a scheduled entity (described further below; e.g., UE 122).

For example, DL transmissions may include unicast or broadcast transmissions of control information and/or traffic information (e.g., user data traffic) from a base station (e.g., base station 110) to one or more UEs (e.g., UEs 122 and 124), while UL transmissions may include transmissions of control information and/or traffic information originating at a UE (e.g., UE 122). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In some examples, access to the air interface may be scheduled, wherein a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

In a further aspect of the RAN 100, sidelink signals may be used between UEs without necessarily relying on scheduling or control information from a base station. For example, two or more UEs (e.g., UEs 138, 140, and 142) may communicate with each other using peer-to-peer (P2P) or sidelink signals 137 without relaying that communication through a base station. In some examples, the UEs 138, 140, and 142 may each function as a scheduling entity or transmitting sidelink device and/or a scheduled entity or a receiving sidelink device to schedule resources and communicate sidelink signals 137 therebetween without relying on scheduling or control information from a base station. In other examples, two or more UEs (e.g., UEs 126 and 128) within the coverage area of a base station (e.g., base station 112) may also communicate sidelink signals 127 over a direct link (sidelink) without conveying that communication through the base station 112. In this example, the base station 112 may allocate resources to the UEs 126 and 128 for the sidelink communication. In either case, such sidelink signaling 127 and 137 may be implemented in a P2P network, a device-to-device (D2D) network, vehicle-to-vehicle (V2V) network, a vehicle-to-everything (V2X), a mesh network, or other suitable direct link network.

In some examples, a D2D relay framework may be included within a cellular network to facilitate relaying of communication to/from the base station 112 via D2D links (e.g., sidelinks 127 or 137). For example, one or more UEs (e.g., UE 128) within the coverage area of the base station 112 may operate as relaying UEs to extend the coverage of the base station 112, improve the transmission reliability to one or more UEs (e.g., UE 126), and/or to allow the base station to recover from a failed UE link due to, for example, blockage or fading.

Two primary technologies that may be used by V2X networks include dedicated short range communication (DSRC) based on IEEE 802.11p standards and cellular V2X based on LTE and/or 5G (New Radio) standards. Various aspects of the present disclosure may relate to New Radio (NR) cellular V2X networks, referred to herein as V2X networks, for simplicity. However, it should be understood that the concepts disclosed herein may not be limited to a particular V2X standard or may be directed to sidelink networks other than V2X networks.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. The exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 100, the ability for a UE to communicate while moving, independent of their location, is referred to as mobility. The various physical channels between the UE and the RAN are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In some examples, a RAN 100 may enable mobility and handovers (i.e., the transfer of a UE's connection from one radio channel to another). For example, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In various implementations, the air interface in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without the need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FRI, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The air interface in the RAN 100 may utilize one or more multiplexing and multiple access algorithms to enable simultaneous communication of the various devices. For example, 5G NR specifications provide multiple access for UL or reverse link transmissions from UEs 122 and 124 to base station 110, and for multiplexing DL or forward link transmissions from the base station 110 to UEs 122 and 124 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 100 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Various aspects of the present disclosure will be described with reference to an OFDM waveform, schematically illustrated in FIG. 2. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 2:
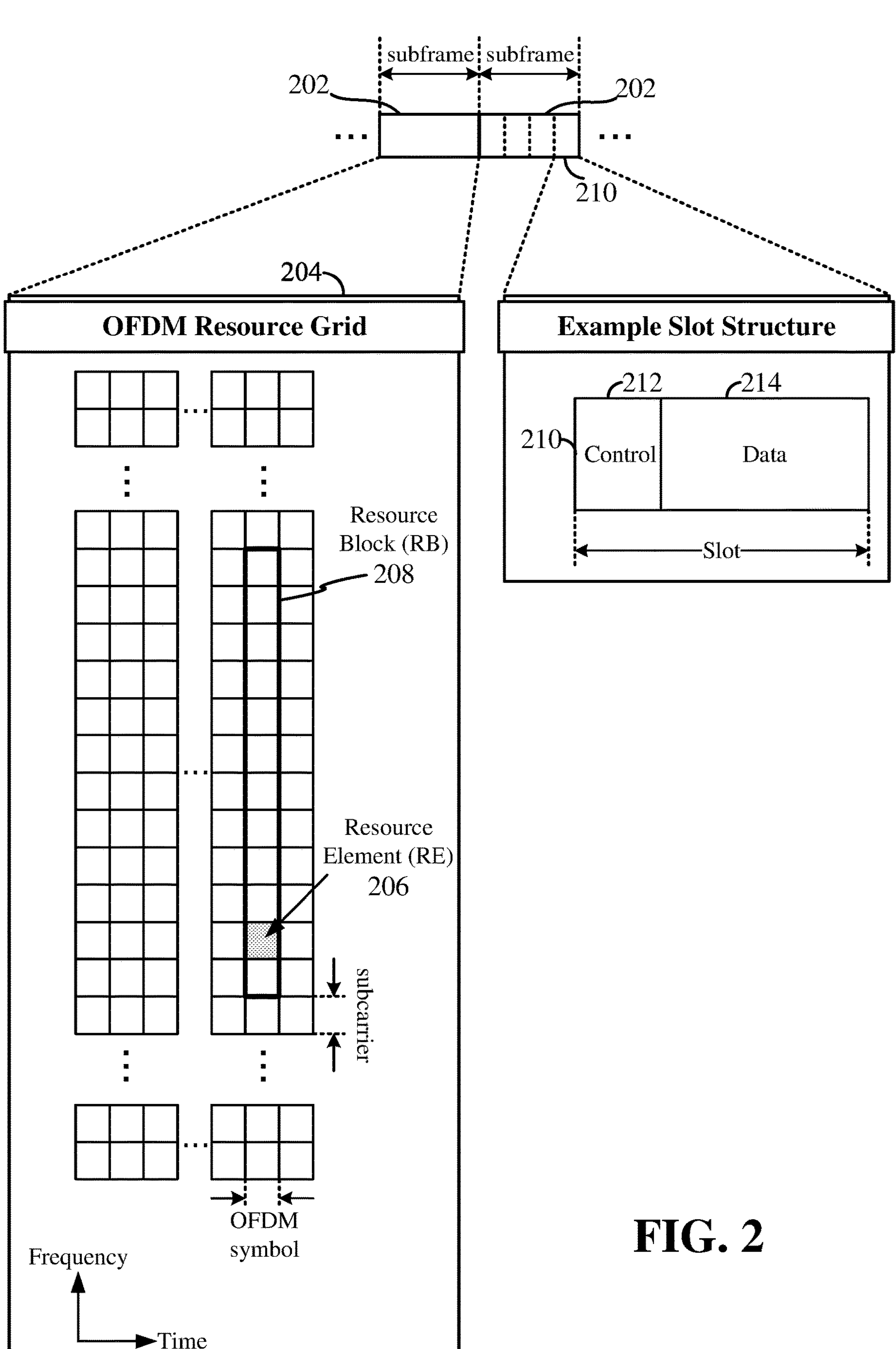
FIG. 2 is a schematic illustration of an organization of wireless resources in an air interface utilizing orthogonal frequency divisional multiplexing (OFDM) according to some aspects.

Referring now to FIG. 2, an expanded view of an exemplary subframe 202 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 204 may be used to schematically represent time-frequency resources for a given antenna port. That is, in a multiple-input-multiple-output (MIMO) implementation with multiple antenna ports available, a corresponding multiple number of resource grids 204 may be available for communication. The resource grid 204 is divided into multiple resource elements (REs) 206. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 208, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 208 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 206 within one or more sub-bands or bandwidth parts (BWPs). Thus, a UE generally utilizes only a subset of the resource grid 204. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a scheduling entity, such as a base station (e.g., gNB, eNB, etc.), or may be self-scheduled by a UE implementing D2D sidelink communication.

In this illustration, the RB 208 is shown as occupying less than the entire bandwidth of the subframe 202, with some subcarriers illustrated above and below the RB 208. In a given implementation, the subframe 202 may have a bandwidth corresponding to any number of one or more RBs 208. Further, in this illustration, the RB 208 is shown as occupying less than the entire duration of the subframe 202, although this is merely one possible example.

Each 1 ms subframe 202 may consist of one or multiple adjacent slots. In the example shown in FIG. 2, one subframe 202 includes four slots 210, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 210 illustrates the slot 210 including a control region 212 and a data region 214. In general, the control region 212 may carry control channels, and the data region 214 may carry data channels. Of course, a slot may contain all DL, all UL, or at least one DL portion and at least one UL portion. The structure illustrated in FIG. 2 is merely exemplary in nature, and different slot structures may be utilized, and may include one or more of each of the control region(s) and data region(s).

Although not illustrated in FIG. 2, the various REs 206 within a RB 208 may be scheduled to carry one or more physical channels, including control channels, shared channels, data channels, etc. Other REs 206 within the RB 208 may also carry pilots or reference signals. These pilots or reference signals may provide for a receiving device to perform channel estimation of the corresponding channel, which may enable coherent demodulation/detection of the control and/or data channels within the RB 208.

In some examples, the slot 210 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 206 (e.g., within the control region 212) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 206 (e.g., in the control region 212 or the data region 214) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information.

In an UL transmission, the scheduled entity (e.g., UE) may utilize one or more REs 206 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 206 (e.g., within the data region 214) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 206 within the data region 214 may be configured to carry other signals, such as one or more SIBs and DMRSs.

In an example of sidelink communication over a sidelink carrier via a proximity service (ProSe) PC5 interface, the control region 212 of the slot 210 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The SCI may be a 2-stage SCI that includes SCI-1 and SCI-2. SCI-1 can be used for the purpose of sensing and broadcast communication, and SCI-2 can carry the remaining information for data scheduling of unicast/groupcast data transmission, for example. The SCI-2 time/frequency location can be derived from the information fields carried in the SCI-1. Both SCI-1 and SC1-2 can be time domain multiplexed in different symbols and/or frequency domain multiplexed in different RBs (interleaved or non-interleaved).

The data region 214 of the slot 210 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 206 within slot 210. For example, HARQ feedback information may be transmitted in a physical sidelink feedback channel (PSFCH) within the slot 210 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 210.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 2 are not necessarily all of the channels or carriers that may be utilized between devices, and those of ordinary skill in the art will recognize that other channels or carriers may be utilized in addition to those illustrated, such as other traffic, control, and feedback channels.

Figure 3:
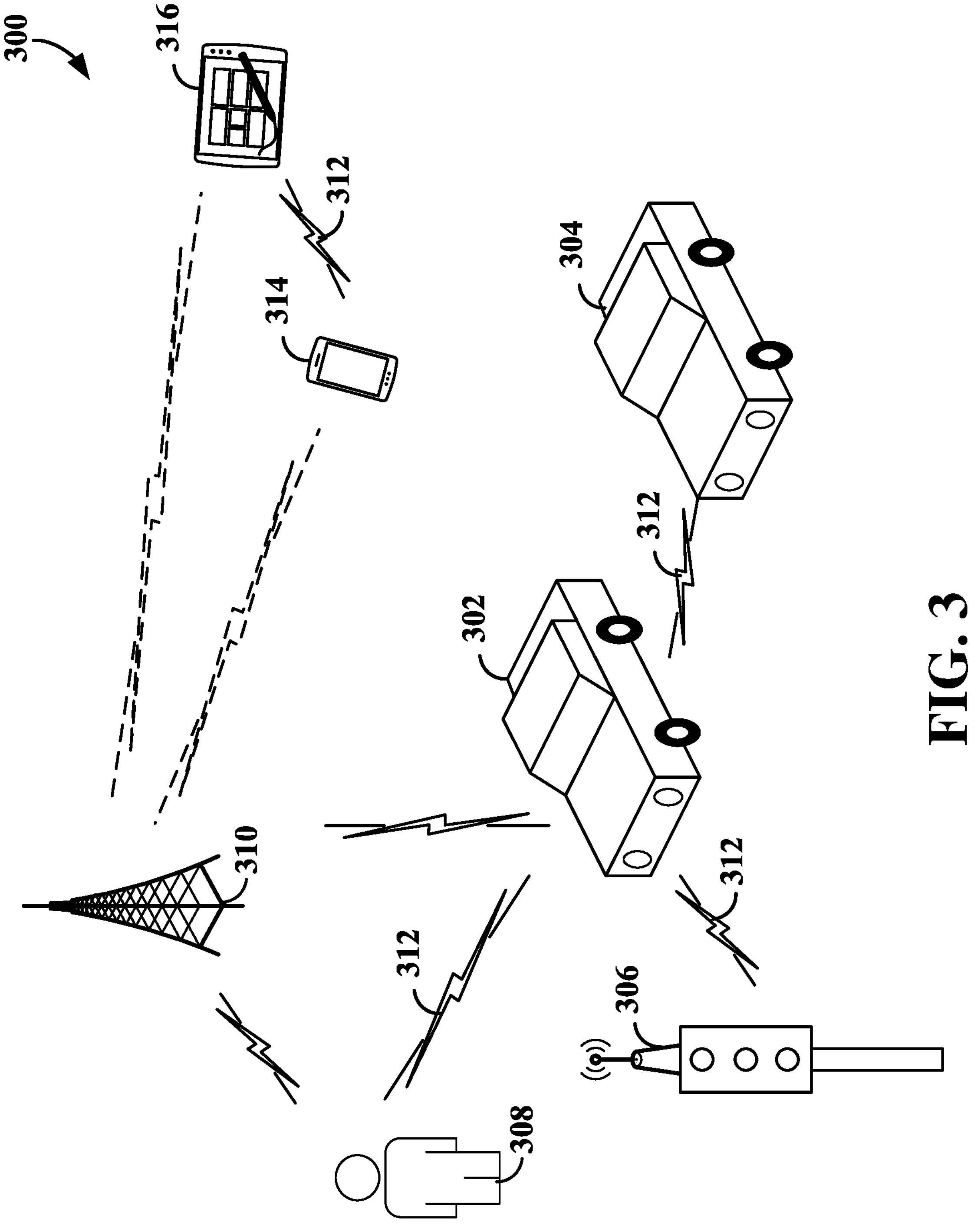
FIG. 3 is a schematic illustration of a vehicle-to-everything (V2X) communication network according to some aspects.

FIG. 3 illustrates an example of a wireless communication network 300 configured to support D2D or sidelink communication. In some examples, sidelink communication may include V2X communication. V2X communication involves the wireless exchange of information directly between not only vehicles (e.g., vehicles 302 and 304) themselves, but also directly between vehicles 302/304 and infrastructure (e.g., roadside units (RSUs) 306), such as streetlights, buildings, traffic cameras, tollbooths or other stationary objects, vehicles 302/304 and pedestrians 308, and vehicles 302/304 and wireless communication networks (e.g., base station 310). In some examples, V2X communication may be implemented using LTE or NR communication.

V2X communication enables V2X devices (e.g., vehicles 302 and 304) to obtain information related to the weather, nearby accidents, road conditions, activities of nearby vehicles and pedestrians, objects nearby the vehicle, and other pertinent information that may be utilized to improve the vehicle driving experience and increase vehicle safety. For example, such V2X data may enable autonomous driving and improve road safety and traffic efficiency. For example, the exchanged V2X data may be utilized by a V2X connected vehicle (e.g., vehicles 302 and 304) to provide in-vehicle collision warnings, road hazard warnings, approaching emergency vehicle warnings, pre-/post-crash warnings and information, emergency brake warnings, traffic jam ahead warnings, lane change warnings, intelligent navigation services, and other similar information. In addition, V2X data received by a V2X connected mobile device of a pedestrian/cyclist 308 may be utilized to trigger an audio alert (e.g., a warning sound), a tactile alert (e.g., vibration), a visual alert (e.g., flashing light), etc., in case of imminent danger (e.g., approaching vehicle).

The sidelink or V2X communication between vehicle-UEs (V-UEs) 302 and 304 or between a V-UE 302 or 304 and either an RSU 306 or a pedestrian-UE (P-UE) 308 may occur over a sidelink (or sidelink channel) 312 utilizing a proximity service (ProSe) PC5 interface. In various aspects of the disclosure, the PC5 interface may further be utilized to support D2D sidelink communication in other proximity use cases (e.g., other than V2X). Examples of other proximity use cases may include smart wearables, public safety, or commercial (e.g., entertainment, education, office, medical, and/or interactive) based proximity services. In the example shown in FIG. 3, ProSe communication may further occur between UEs 314 and 316.

ProSe communication may support different operational scenarios, such as in-coverage, out-of-coverage, and partial coverage. Out-of-coverage refers to a scenario in which UEs (e.g., UEs 314 and 316) are outside of the coverage area of a base station (e.g., base station 310), but each are still configured for ProSe communication. Partial coverage refers to a scenario in which some of the UEs (e.g., V-UE 304) are outside of the coverage area of the base station 310, while other UEs (e.g., V-UE 302 and P-UE 308) are in communication with the base station 310. In-coverage refers to a scenario in which UEs (e.g., V-UE 302 and P-UE 308) are in communication with the base station 310 (e.g., gNB) via a Uu (e.g., cellular interface) connection to receive ProSe service authorization and provisioning information to support ProSe operations.

To facilitate D2D or V2X sidelink communication between V2X devices (e.g., V-UE 302 and V-UE 304) over the sidelink 312, two V2X devices may transmit discovery signals therebetween. In some examples, each discovery signal may include a synchronization signal, such as a primary synchronization signal (PSS) and/or a secondary synchronization signal (SSS) of a sidelink SSB that facilitates device discovery and enables synchronization of communication on the sidelink 312. For example, the discovery signal may be utilized by the V-UE 302 to measure the signal strength (e.g., signal-to-noise ratio (SNR), reference signal received power (RSRP)) and channel status of a potential sidelink (e.g., sidelink 312) with another UE (e.g., V-UE 304). The V-UE 302 may utilize the measurement results to select a UE (e.g., V-UE 304) for sidelink communication or relay communication.

Figure 4:
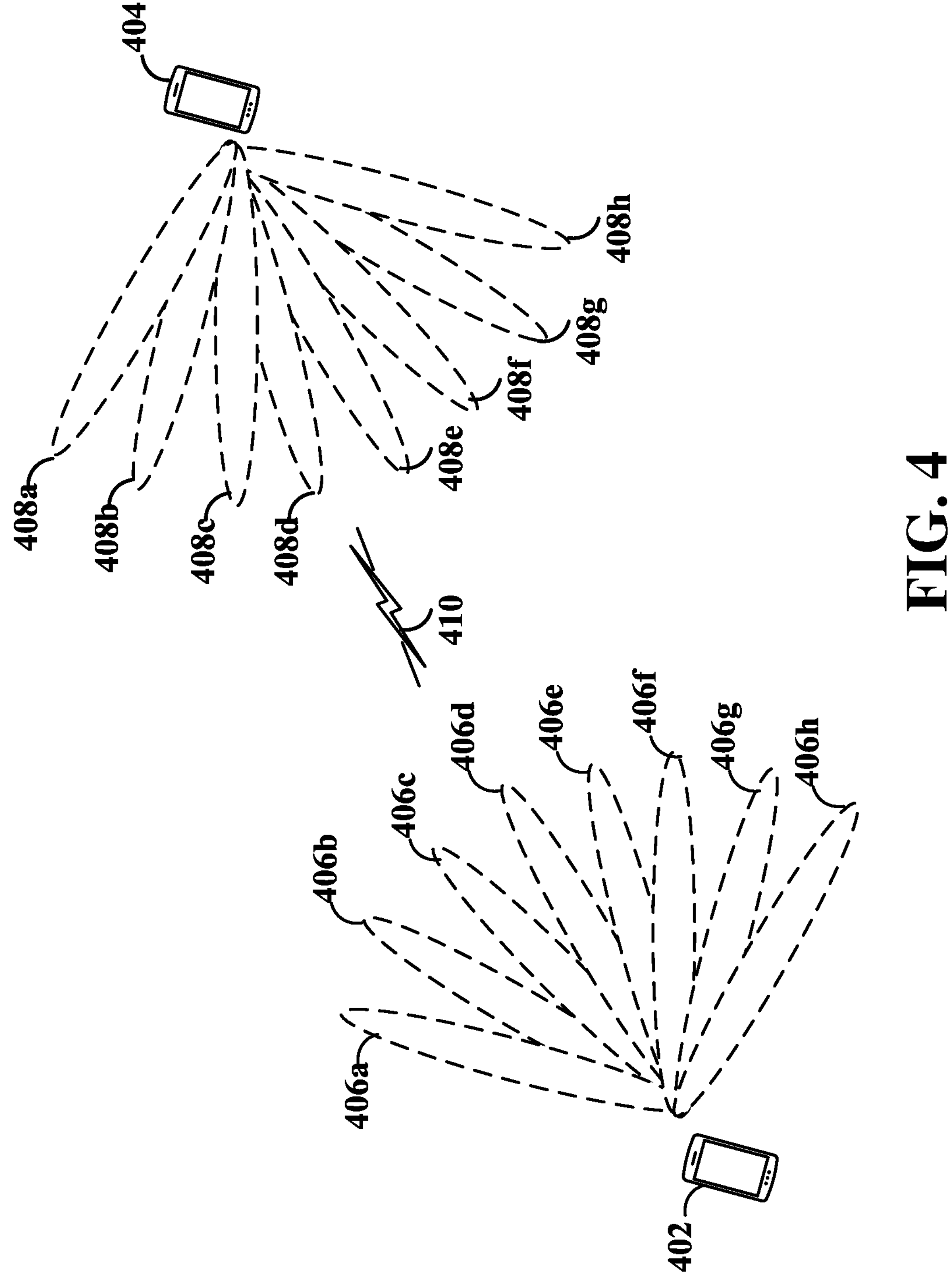
FIG. 4 is a schematic illustration of communication between wireless communication devices using beamformed sidelink signals according to some aspects.

FIG. 4 is a diagram illustrating communication between wireless communication devices 402 and 404 using beamformed sidelink signals according to some aspects. Each of the wireless communication devices 402 and 404 may be any of the UEs or V2X devices illustrated in any of FIGS. 1, 3, 5, 7, and/or 11.

In the example shown in FIG. 4, the wireless communication devices 402 and 404 may be configured to communicate sidelink signals 410 on one or more of a plurality of beams 406*a*-406*h*. Although the beams 406*a*-406*h* are illustrated in FIG. 4 as being generated on wireless communication device 402, it should be understood that the same concepts described herein apply to beams generated on wireless communication device 404. For example, each wireless communication device 402 and 404 may select one or more beams to transmit sidelink signals to the other wireless communication device. In some examples, due to channel reciprocity, the selected beam(s) on each wireless communication device 402 and 404 may be used for both transmission and reception of sidelink signals. It should be noted that while some beams are illustrated as adjacent to one another, such an arrangement may be different in different aspects. In some examples, the wireless communication devices 402 and 404 may generate more or less beams distributed in different directions.

The number of beams on which a particular wireless communication device 402 or 404 can use may be determined based on NR sidelink (SL) standards and specifications and capabilities of the wireless communication devices 402 and 404. For example, the number of beams may be determined based on a number of antenna panels configured on the wireless communication device 402 or 404. As an example, a wireless communication device 402 or 404 may include one or two antenna panels, and as such, may be configured to communicate on one or two beams, respectively, at a time. Each beam may be utilized to transmit a respective layer for MIMO communication. Other numbers of simultaneous beams are also possible in the present disclosure.

In some examples, to select one or more beams for communication on a sidelink between the two wireless communication devices 402 and 404, a first wireless communication device (e.g., wireless communication device 402) may transmit a sidelink reference signal, such as a sidelink synchronization signal block (SSB) or sidelink channel state information (CSI) reference signal (RS), on each of the plurality of beams 406*a*-406*h* in a beam-sweeping manner towards a second wireless communication device (e.g., wireless communication device 404). The second wireless communication device 404 searches for and identifies the beams based on the beam reference signals. The second wireless communication device 404 then performs beam measurements (e.g., reference signal received power (RSRP), signal-to-interference-plus-noise ratio (SINR), reference signal received quality (RSRQ), etc.) on the beam reference signals to determine the respective beam quality of each of the beams.

The second wireless communication device 404 may then transmit a beam measurement report to the first wireless communication device 402 indicating the beam quality of one or more of the measured beams. The first wireless communication device or a radio access network (RAN) node (e.g., a base station or scheduling entity, such as a gNB) may then select the particular beam(s) for communication between the first and second wireless communication devices on the sidelink based on the beam measurement report. For example, the first wireless communication device may forward the beam measurement report to the base station for selection of the beam(s). The base station may then signal the selected beam(s) via, for example, a radio resource control (RRC) message or via a medium access control (MAC) control element (CE).

Each selected beam (e.g., beam 406*d*) on one of the wireless communication devices (e.g., wireless communication device 402) may form a beam pair link (BPL) 410 with a corresponding selected beam (e.g., beam 408*d*) on the other wireless communication device 404. Thus, each BPL includes corresponding transmit and receive beams on the wireless communication devices 402 and 404. For example, a BPL may include a first transmit/receive beam 406*d* on the first wireless communication device 402 and a second transmit/receive beam 408*d* on the second wireless communication device 404. To increase the data rate, multiple BPLs can be used to facilitate spatial multiplexing of multiple data streams. In some examples, the different BPLs can include beams from different antenna panels.

Due to scarcity of spectrum, NR V2X devices and LTE V2X devices may share communication resources (e.g., time and frequency resources) in a V2X network. The NR V2X devices may be dual-radio devices and can support NR and/or LTE for V2X communication. For example, an NR V2X device can transmit basic safety message (BSM) and cooperative awareness message (CAM) packets using LTE V2X communication and transmit sensor sharing/other traffic using NR V2X communication. The LTE V2X devices support only LTE communication. If no coordination mechanism between NR V2X devices and LTE V2X devices are used, NR V2X transmission may collide with LTE V2X transmission when they share the same time-frequency resources. In that case, both NR and LTE performance will be degraded due to the collision.

In some aspects, NR V2X devices and LTE V2X devices can coordinate communication resource sharing using a resource pool frame structure that partitions communication resources between NR V2X devices and LTE V2X devices. The resource pool frame structure can share the resources between NR devices and LTE devices using time and/or frequency multiplexing schemes. The resource pool frame structure can be determined based on an NR penetration rate that indicates the percentage of V2X devices (e.g., UEs) with NR capability in a certain region.

Figure 5:
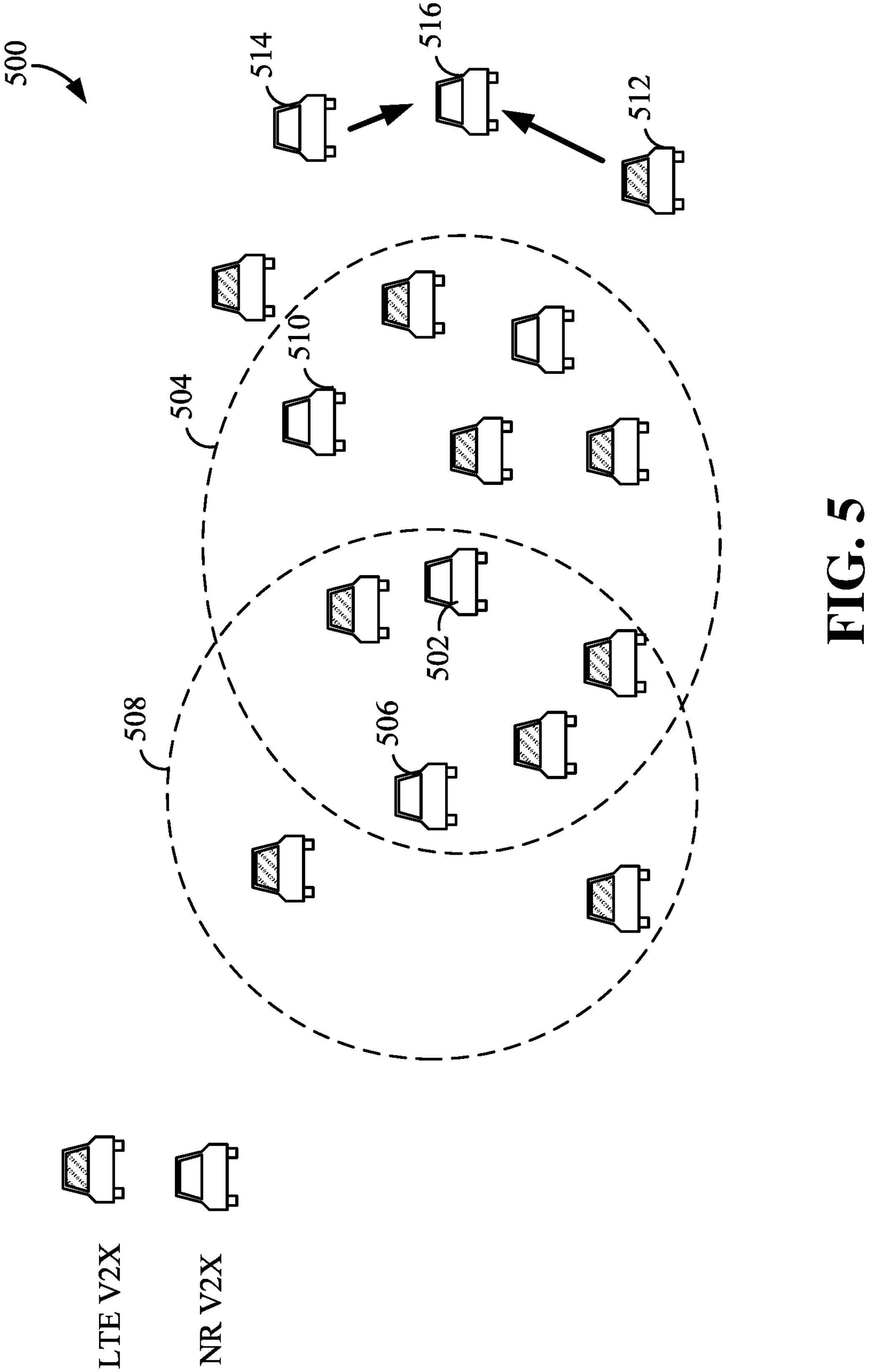
FIG. 5 is a schematic illustration of a coexistence example of New Radio (NR) and Long-Term Evolution (LTE) V2X devices according to some aspects.
Figure 6:
FIG. 6 is a schematic illustration of an exemplary resource pool frame structure according to some aspects.

FIG. 5 is a diagram illustrating a coexistence example of LTE V2X devices and NR V2X devices in a V2X network according to some aspects. Some exemplary NR V2X devices and LTE V2X devices are illustrated in a V2X network 500 of FIG. 5. For example, a first NR V2X device 502 may communicate with other V2X devices in a first area 504, and a second NR V2X device 506 may communicate with other V2X devices in a second area 508. The LTE V2X devices and NR V2X devices in FIG. 5 can coordinate resource sharing using a resource pool frame structure. FIG. 6 is a diagram illustrating an example of a resource pool frame structure 600 for facilitating NR-LTE coexistence in a V2X network according to some aspects.

V2X devices may use the resource pool frame structure 600 for reserving resources for NR or LTE V2X communications when LTE V2X devices coexist with NR V2X devices in an area (e.g., area 504 or 508). Resource sharing coordination between devices may help V2X devices to avoid resource usage collisions. The resource pool frame structure 600 may be partitioned into NR V2X resources and LTE V2X resources. For example, the resource pool frame structure 600 may include time division multiplexing (TDM) slots designated for NR V2X resources, for example, NR V2X normal slots 602 and NR V2X control slots 604 for a PSFCH. The partitioned resource pool frame structure 600 may also include slots designated for LTE V2X resources (e.g., LTE V2X slots 606). In some aspects, resources in the same slot may be shared using frequency division multiplexing (FDM). In some aspects, NR V2X devices may transmit LTE schedule assignment (SA) messages regarding reserved resources such that LTE V2X devices may be aware of NR V2X resource reservation information. In FIG. 6, the portions of resources reserved for NR and LTE are illustrative only, and different ways of partitioning the resource pool frame structure 600 between NR and LTE may be used in other examples.

In some aspects, the resource pool frame structure 600 may be partitioned based on NR and LTE traffic loading and/or a penetration rate of NR V2X devices. An NR penetration rate can indicate a quantity or portion of NR devices out of a plurality of V2X devices (e.g., LTE and NR devices) in an area. For example, if the NR penetration rate is x % for a first region, then x % of the resource pool frame structure 600 can be allocated as NR V2X resources (e.g., one or more slots in a TDM manner). In one example, a first NR V2X device 502 in a first area 504 (see FIG. 5) can determine an NR penetration rate of 40% (e.g., 4 NR V2X devices and 6 LTE V2X devices in area 504). In another example, a second NR V2X device 506 in a second area 508 (see FIG. 5) can determine an NR penetration rate of about 28% (e.g., 2 NR V2X devices and 5 LTE V2X devices in area 508). The resource pool frame structure 600 shows an example of partitioned resources for NR and LTE based on an estimated NR penetration rate of 50%. The resource pool frame structure 600 may have different partitions for different NR penetration rates. An NR V2X device can update its NR penetration rate due to its movement to a new location, changing neighboring V2X devices, and/or a change in the data traffic load/congestion in the network.

In order to determine the NR penetration rate, a V2X device needs to determine the capability of other nearby V2X devices in an area or V2X network. In one example, a V2X device can transmit an indication in the LTE sidelink (SL) control information or in a MAC control element (CE) to indicate that the device is capable of NR and/or LTE communication. In another example, a V2X device can estimate the NR penetration rate using a channel busy ratio (CBR) or by determining resource reservation through control and data decoding (for both NR and LTE V2X communication). CBR can be defined as a ratio between the time the channel is sensed as busy and the total observation time (e.g., 100 ms). CBR is a measure of the channel loading perceived by a V2X device. Each NR V2X device can adjust the resource pool frame structure based on the latest NR penetration rate estimation. In some aspects, LTE and NR resources may be time-multiplexed (e.g., on different slots) or frequency-multiplexed in the same slot. In some aspects, the resource pool frame structure 600 can contain PSFCH resources (NR V2X control slot 604) for NR sidelink feedback.

Due to local variations in the distribution of V2X devices and/or due to changing traffic patterns, different NR devices (V2X devices 502 and 506) in the network may have different estimations of the NR penetration rate. In some aspects, exchanging NR penetration rates between V2X devices can help the V2X devices in the network to arrive at a unified NR penetration rate to better utilize resources in a certain area as well as reducing LTE-NR collisions. Furthermore, using a unified NR penetration rate among a pool of V2X devices can provide a more accurate NR penetration rate estimation despite local penetration rate fluctuations. For example, in FIG. 5, the first V2X device 502 can estimate a local NR penetration rate by decoding packets from a nearby third V2X device 510, but the second V2X device 506 may not be able to decode the packets from the third V2X device 510 due to the greater distance between the devices. In general, the signal interference range is much longer than the packet decoding range. Therefore, V2X transmission from the third V2X device 510 may still cause interference to the second V2X device 506 even though the second V2X device 506 does not count the third V2X device 510 in NR penetration rate estimation. In this case, the NR penetration rate estimation of the second V2X device 506 does not take the potential interference from the third V2X device 510 into account.

In one example, an LTE V2X device 512 may have determined a 20% NR penetration rate in a certain area. In this case, the LTE V2X device 512 may decide that up to 80% of the resource pool frame structure 600 can be used for LTE communication, and only 20% of the resource pool frame structure 600 can be used for NR communication. However, an NR V2X device 514 may have determined a 40% NR penetration rate in the area, so that the NR V2X device 514 can use up to 40% portion of the resource pool frame structure 600. In this case, there can be at least 20% overlapping of resources (e.g., time and frequency resources mismatch) between the LTE V2X device 512 and NR V2X device 514 NR penetration estimations. Therefore, V2X transmissions of the LTE V2X device 512 and NR V2X device 514 may overlap in time and frequency and interfere with other V2X receivers (e.g., V2X device 516) near the LTE V2X device 512 and NR V2X device 514.

In some aspects, V2X devices can use a unified NR penetration rate for selecting a suitable resource frame structure. For example, VX2 devices can indicate their respective estimated NR penetration rates to each other in order to determine a unified NR penetration rate for a pool of V2X devices. Using a unified NR penetration rate can reduce the mismatch between NR penetration rates among V2X devices in the pool.

Figure 7:
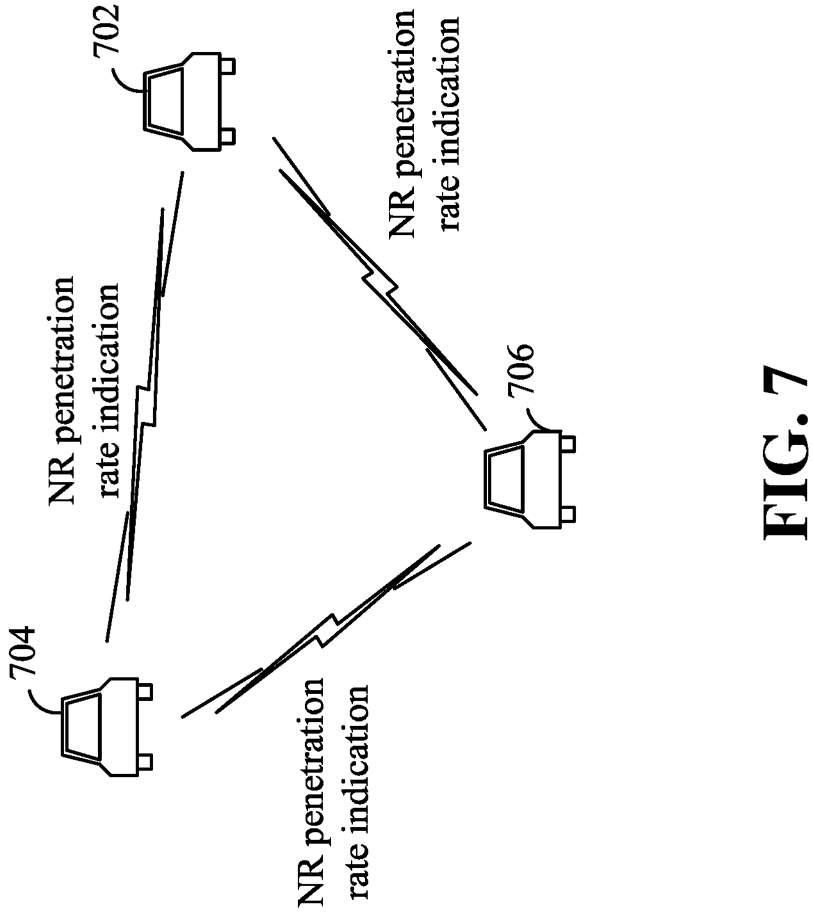
FIG. 7 is a schematic illustration of NR penetration rate indication between V2X devices according to some aspects.

FIG. 7 is a diagram illustrating an example of NR penetration rate indication between V2X devices in accordance with some aspects. For example, in FIG. 7, a pool of V2X devices may include a first V2X device 702, a second V2X device 704, and a third V2X device 706. By indicating their NR penetration rates to each other, the V2X devices can determine a unified NR penetration rate to reduce the mismatch between their NR penetration rates. The first V2X device 702 can indicate its NR penetration rate to other V2X devices (e.g., the second V2X device 704 and the third V2X device 706) that are in the communication range. Similarly, the second V2X device 704 can indicate its NR penetration rate to other V2X devices (e.g., the first V2X device 702 and third V2X device 706). In the same way, the third V2X device 706 can indicate its NR penetration rate to other V2X devices (e.g., the first V2X device 702 and second V2X device 704). In one aspect, a V2X device may indicate the NR penetration rate information in a sidelink (e.g., PC5) MAC-CE and/or sidelink control information (e.g., SCI-2). In one aspect, the V2X device can always include the NR penetration rate information in a V2X transmission.

After receiving the NR penetration rate information from other V2X devices, a V2X device (e.g., an NR V2X device) can update its own NR penetration rate estimation based on the received NR penetration rate information. In one aspect, the V2X device can determine a unified NR penetration rate by averaging over multiple NR penetration rates that can include a local NR penetration rate and NR penetration rates received from other V2X devices. In another aspect, the V2X device can determine a unified NR penetration rate by averaging over multiple NR penetration rates that can include a local NR penetration rate and weighted NR penetration rates received from other V2X devices. In one aspect, the weights of the NR penetration rates may be determined based on the device distance, received RSRP, group subscription, etc. In one example, the NR penetration rate received from a closer V2X device may have a greater weight than the NR penetration rate received from a further away V2X device. In one example, the NR penetration rate received from a V2X device with greater received RSRP can be given more weight than the NR penetration rate received from a V2X device with lower received RSRP.

Figure 8:
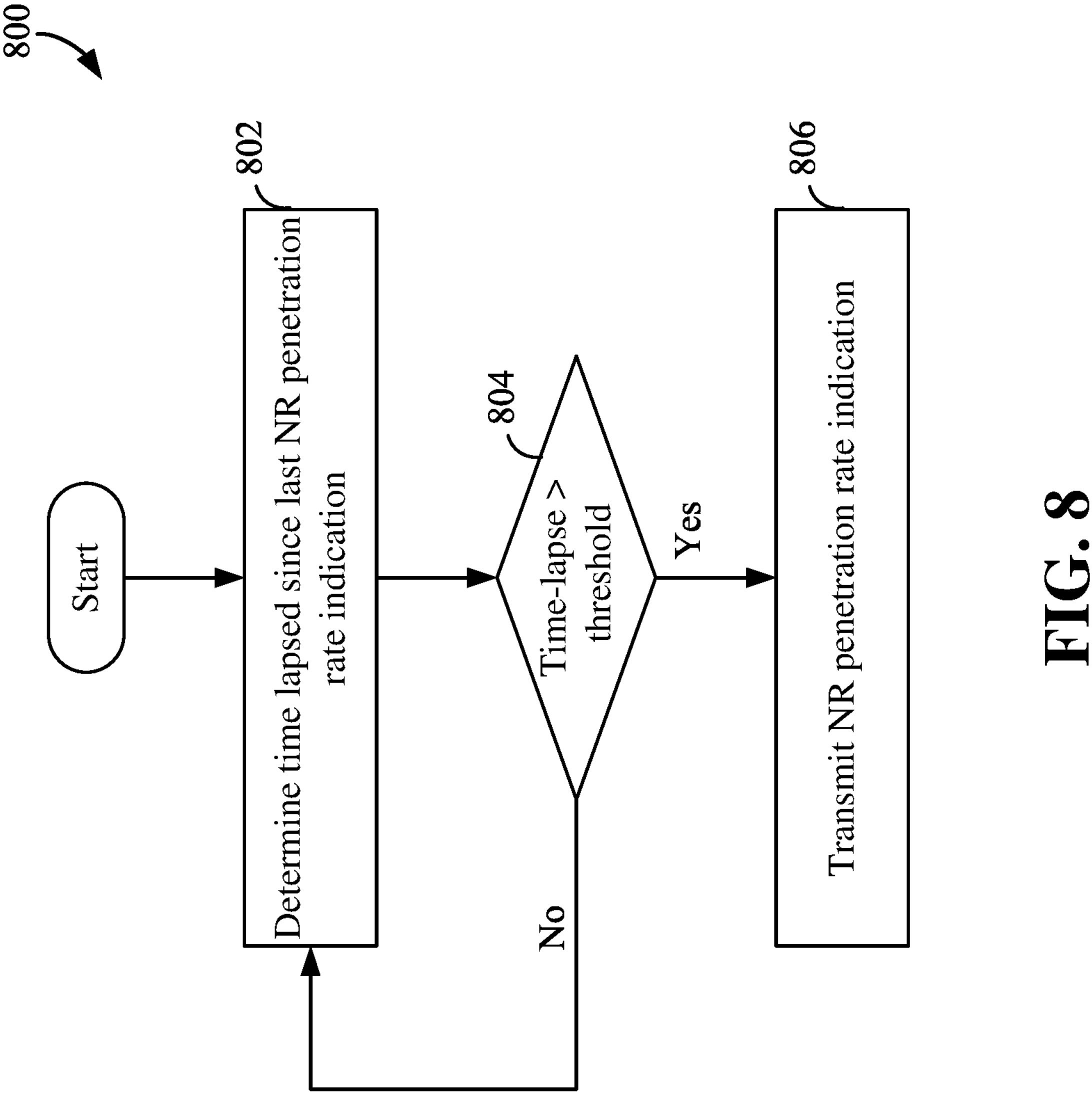
FIG. 8 is a flow chart illustrating an NR penetration rate indication process based on time-lapse according to some aspects.

A V2X device can transmit NR penetration rate information in various scenarios. In one aspect, the NR penetration rate information may be included in V2X data packet(s) transmitted only after a certain period or predetermined time interval has elapsed since the last NR penetration rate indication. FIG. 8 is a flow chart illustrating an NR penetration rate indication process 800 based on time-lapse according to some aspects. At block 802, a V2X device can determine the time lapsed since the last or previous transmission of NR penetration rate indication or information. At decision block 804, if the time-lapse is greater than a predetermined threshold, the process continues at block 806; otherwise, the process goes back to block 802. At block 806, the V2X device can transmit an NR penetration rate indication, for example, included in a V2X data transmission or as a stand-alone V2X transmission.

Figure 9:
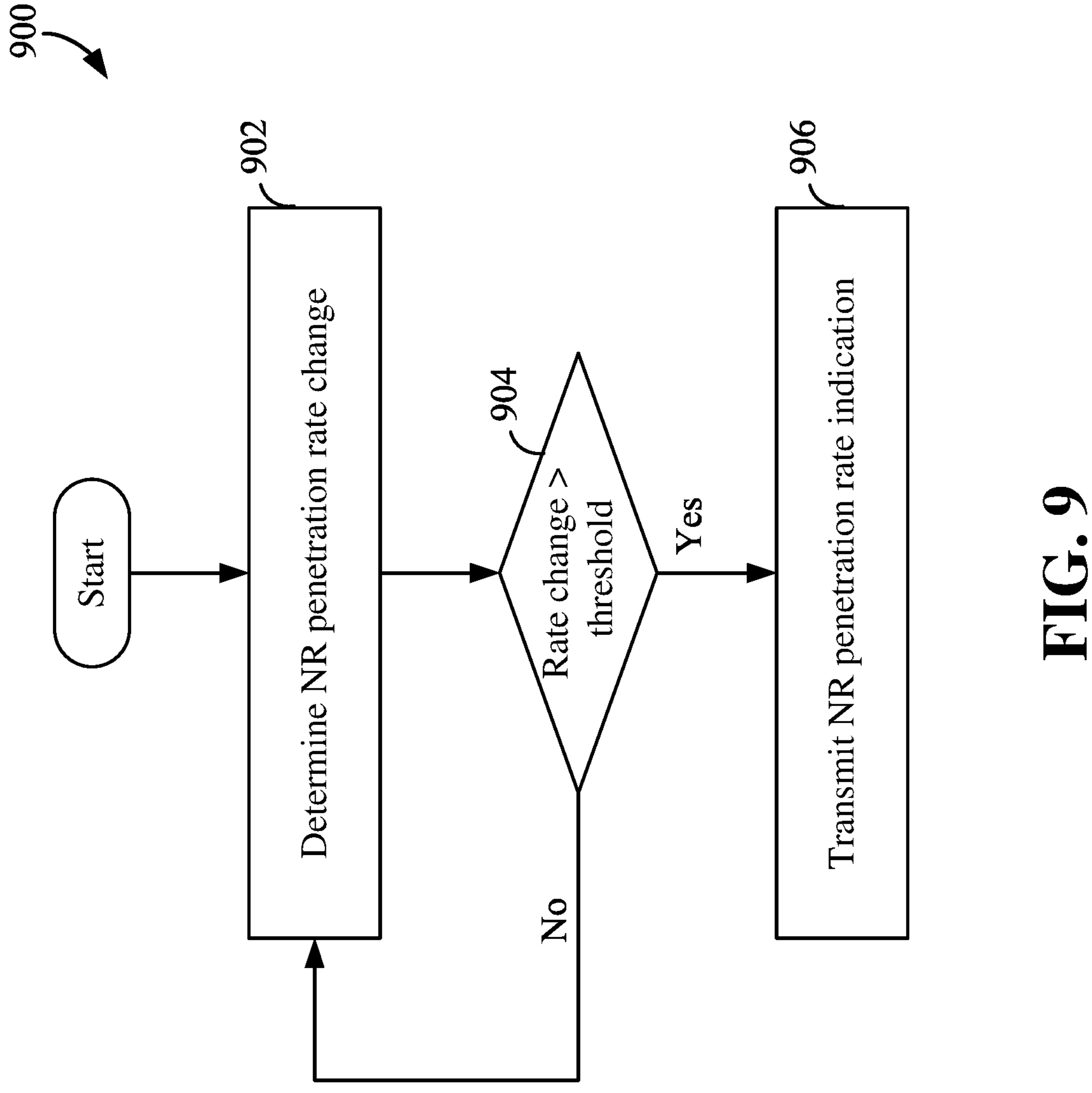
FIG. 9 is a flow chart illustrating an NR penetration rate indication process based on NR penetration rate changes according to some aspects.

FIG. 9 is a flow chart illustrating an NR penetration rate indication process 900 based on NR penetration rate changes according to some aspects. At block 902, a V2X device can determine an NR penetration rate change. For example, the V2X device may have moved from a lower NR penetration area (e.g., area 508 of FIG. 5) to a higher NR penetration area (e.g., area 504 of FIG. 5). At decision block 904, the V2X device can determine whether or not the NR penetration rate change is greater than a predetermined threshold since the last or previous transmission of NR penetration rate information. If the NR penetration rate change is greater than the predetermined threshold, the process continues at block 906; otherwise, the process goes back to block 902. At block 906, the V2X device can transmit NR penetration rate indication information together with V2X data transmissions and/or as stand-alone V2X transmissions.

Figure 10:
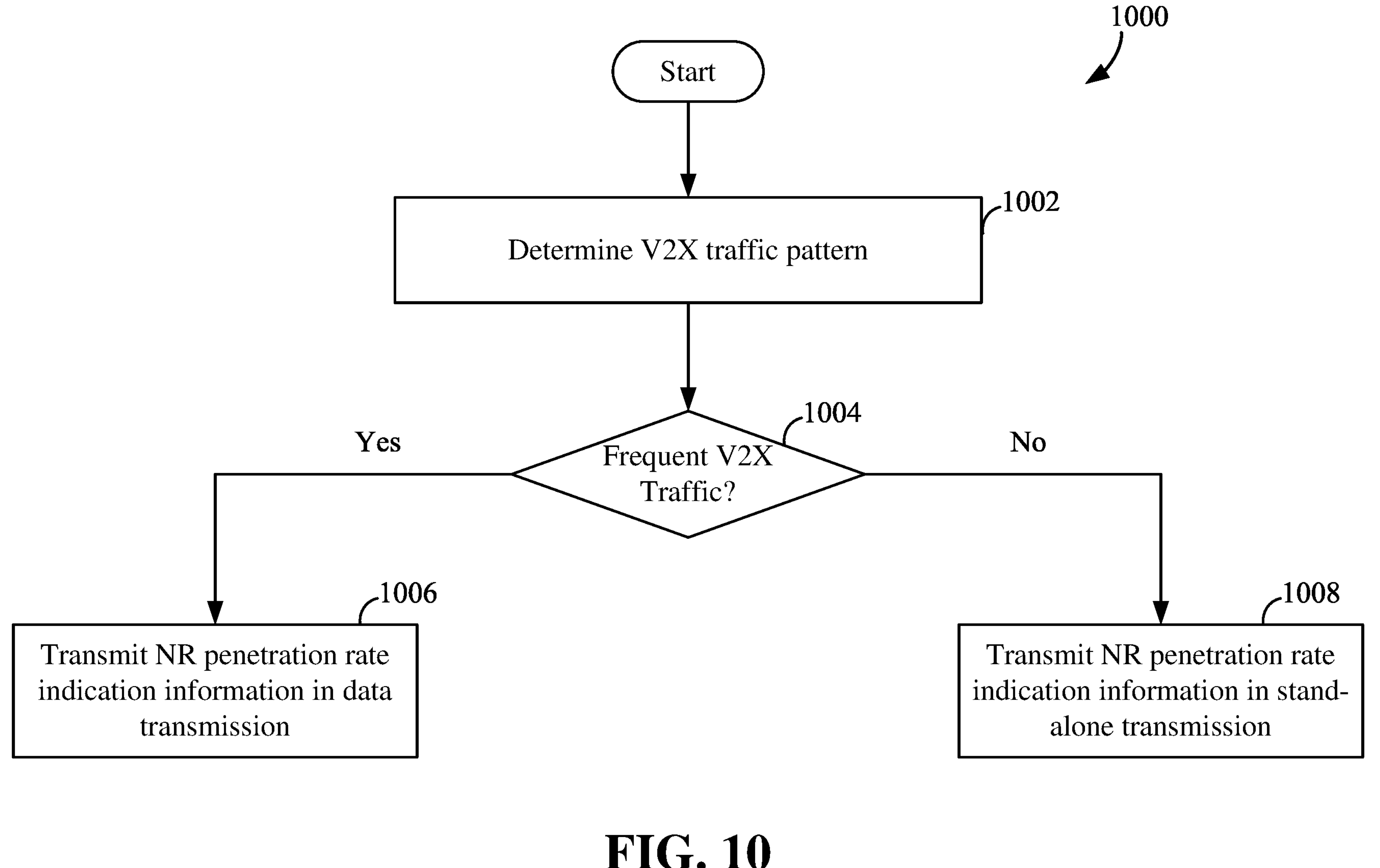
FIG. 10 is a flow chart illustrating an NR penetration rate indication process 1000 based on traffic pattern according to some aspects.

FIG. 10 is a flow chart illustrating a process 1000 for NR penetration rate indication based on traffic patterns according to some aspects. At block 1002, a V2X device can determine a V2X traffic pattern in a V2X network (e.g., V2X network 500). At decision block 1004, if the V2X traffic loading or frequency is above a threshold, the process 1000 continues at block 1006; otherwise, the process continues at block 1008. At block 1006, the V2X device can transmit NR penetration rate information in a V2X data transmission when the V2X traffic is greater than a threshold. At block 1008, the V2X device can transmit NR penetration rate information in a stand-alone V2X transmission when the V2X traffic is lower than a threshold. For example, when the network has frequent V2X data transmissions, the V2X device can include NR penetration rate information in V2X data transmissions. On the contrary, when the network has infrequent V2X traffic or data transmissions, the V2X device can indicate NR penetration rate information in stand-alone V2X transmissions.

Figure 11:
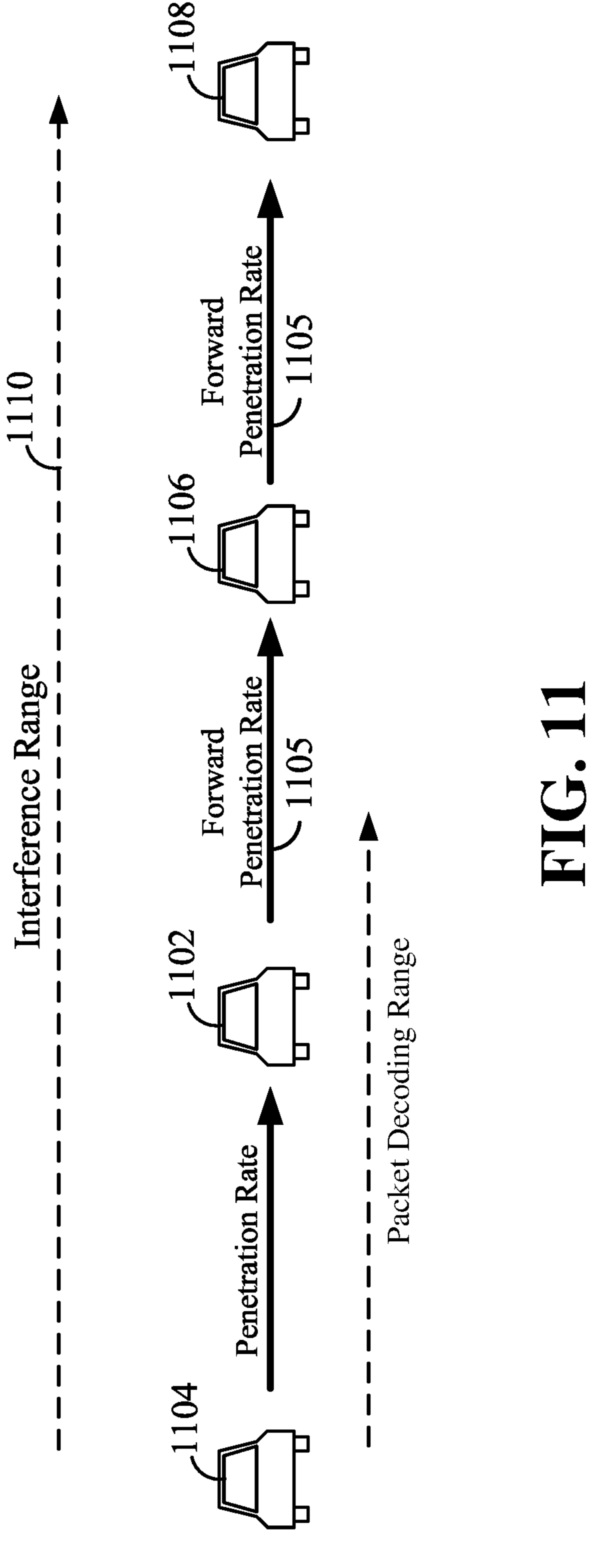
FIG. 11 is a diagram illustrating a process for forwarding NR penetration rate information according to some aspects.

FIG. 11 is a diagram illustrating a process for forwarding NR penetration rate information according to some aspects. Forwarding NR penetration rate information allows a V2X device to receive NR penetration rate information from a potentially interfering V2X device that is out of a decoding range. Therefore, NR penetration rate information forwarding can bridge the gap between a packet decoding range and a signal interference range. In FIG. 11, a first V2X device 1102 (e.g., an NR UE) can receive NR penetration rate information from a second V2X device 1104 that is within a packet decoding range of the first V2X device 1102. The first V2X device 1102 can forward the NR penetration rate information 1105 to other V2X devices in a decoding range. For example, the first V2X device 1102 can forward the NR penetration rate information 1105 of the second V2X device 1104 to a third V2X device 1106 that is located outside the decoding range 1107 of the second V2X device 1104. In one example, the third V2X device 1106 can further forward the NR penetration rate information 1105 of the second V2X device 1104 to a fourth V2X device 1108 that is located outside the decoding range of the second V2X device 1104. While the third V2X device 1106 and fourth V2X device 1108 may be outside the decoding range of the NR penetration rate information from the second V2X device 1104, the third V2X device 1106 and fourth V2X device 1108 may still be within an interference range 1110 of the second V2X device 1104. By forwarding the NR penetration rate information of the second V2X device 1104, the third V2X device 1106 and the fourth V2X device 1108 can consider the NR penetration rate information from the second V2X device 1104 in NR penetration rate estimation. Therefore, the mismatch in NR penetration rate estimation between the V2X devices 1102, 1106, and 1108 can be reduced or avoided.

In some aspects, a V2X device (e.g., V2X device 1102 or 1106) can forward NR penetration rate information using sidelink MAC-CE and/or SCI (e.g., SCI-2) along with its own current NR penetration rate estimation. In some examples, the NR penetration rate information may include an NR-LTE device ratio and/or actual numbers of NR devices and LTE devices. In some aspects, a V2X device can forward the NR penetration rate information with additional information.

In one aspect, the additional information can include location information (e.g., zone ID) of the V2X device associated with the forwarded NR penetration rate information. The receiver V2X device can use the location information to determine or estimate a distance or interference range of the V2X device associated with the forwarded NR penetration rate information. In one aspect, the additional information can include signal quality information (e.g., RSRP and/or RSRQ) of the V2X transmission from which the forwarded NR penetration information is received. The receiver V2X device can use the signal quality information to determine or estimate a distance or interference range of the V2X device associated with the forwarded NR penetration rate information. In one aspect, the additional information can include a hop count of the NR penetration rate information being forwarded. For example, the forwarded NR penetration rate information received by the third V2X device 1106 has a hop count of two, and the forwarded NR penetration rate information received by the fourth V2X device 1108 has a hop count of three. For example, a receiver V2X device may disregard forwarded NR penetration rate information that has a hop count greater than 2 or more. In one example, the additional information can include link information, for example, group ID, unicast peer information, etc., associated with the V2X device that transmitted NR penetration rate information.

The receiver V2X device of the forwarded NR penetration rate information may use one or more of the above described additional information to update its own NR penetration rate estimate, for example, using averaging of the NR penetration rates or weighted NR penetration rates. In one example, a V2X device can apply different weights to forwarded NR penetration rates according to the location information (e.g., zone ID) and/or the signal quality (e.g., RSRP). For example, a lower weight may be applied to a forwarded NR penetration rate associated with a V2X device at a greater distance or lower RSRP, and a higher weight may be applied to a forwarded NR penetration rate associated with a V2X device at a closer distance or greater RSRP.

Figure 12:
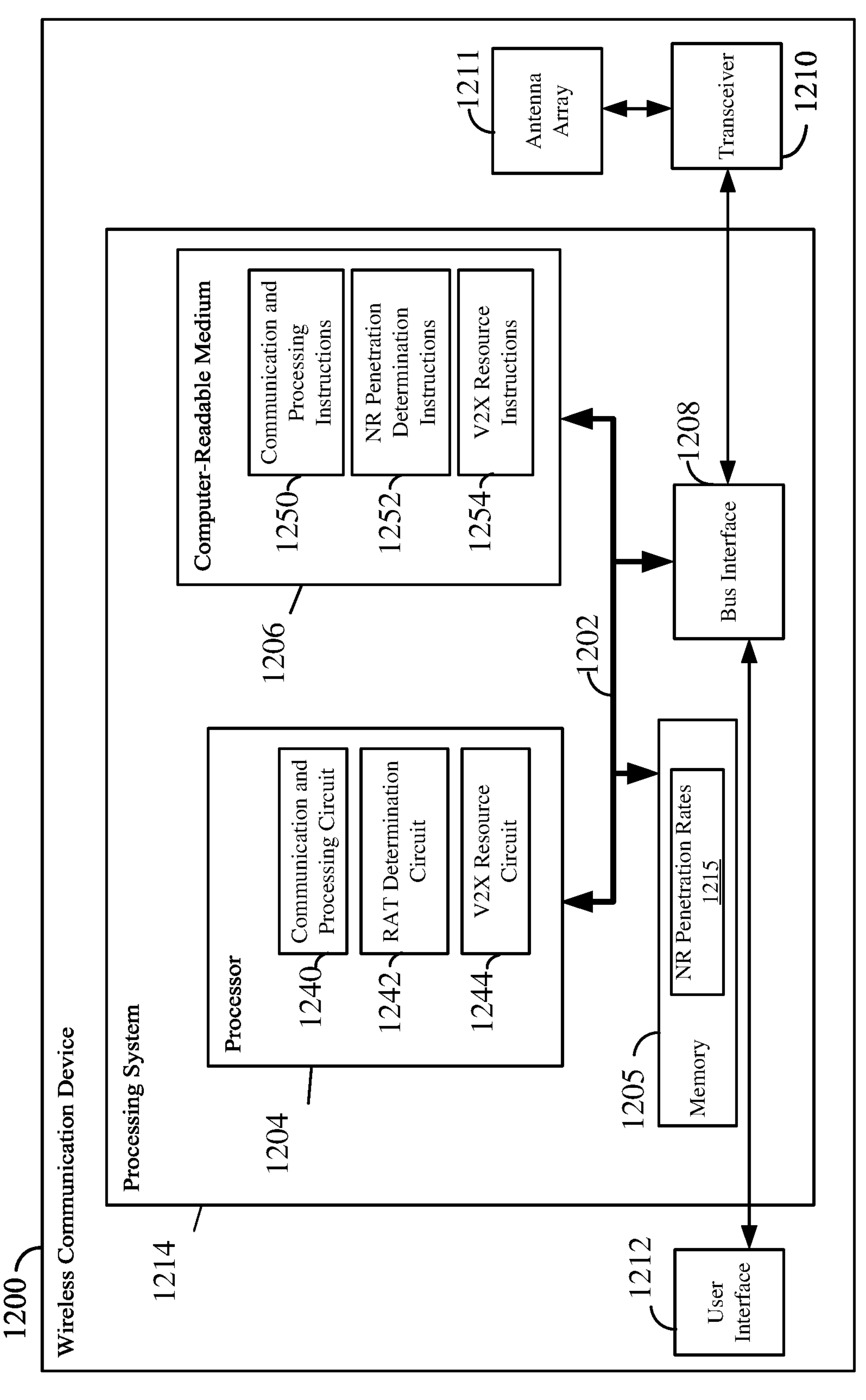
FIG. 12 is a block diagram illustrating an example of a hardware implementation for a wireless communication device according to some aspects.

FIG. 12 is a block diagram illustrating an example of a hardware implementation for a wireless communication device 1200 employing a processing system 1214. For example, the wireless communication device 1200 may be a user equipment (UE), a scheduled entity, or a V2X device as illustrated in any one or more of FIGS. 1, 3-5, 7, and/or 11.

The wireless communication device 1200 may be implemented with a processing system 1214 that includes one or more processors 1204. Examples of processors 1204 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless communication device 1200 may be configured to perform any one or more of the functions described herein. That is, the processor 1204, as utilized in a wireless communication device 1200, may be used to implement any one or more of the processes and procedures described below and illustrated in FIG. 13.

The processor 1204 may in some instances be implemented via a baseband or modem chip and in other implementations, the processor 1204 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1214 may be implemented with a bus architecture, represented generally by the bus 1202. The bus 1202 may include any number of interconnecting buses and bridges depending on the specific application of the processing system 1214 and the overall design constraints. The bus 1202 communicatively couples together various circuits including one or more processors (represented generally by the processor 1204), a memory 1205, and computer-readable media (represented generally by the computer-readable medium 1206). The bus 1202 may also link various other circuits such as timing sources, peripherals, voltage regulators, and power management circuits, which are well known in the art, and therefore, will not be described any further. A bus interface 1208 provides an interface between the bus 1202 and a transceiver 1210. The transceiver 1210 provides a communication interface or means for communicating with various other apparatus over a transmission medium via an antenna array 1211. Depending upon the nature of the apparatus, a user interface 1212 (e.g., keypad, display, speaker, microphone, joystick, touchscreen) may also be provided. Of course, such a user interface 1212 is optional, and may be omitted in some examples, such as a base station.

The processor 1204 is responsible for managing the bus 1202 and general processing, including the execution of software stored on the computer-readable medium 1206. The software, when executed by the processor 1204, causes the processing system 1214 to perform the various functions described below for any particular apparatus. The computer-readable medium 1206 and the memory 1205 may also be used for storing data that is manipulated by the processor 1204 when executing software.

One or more processors 1204 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1206. The computer-readable medium 1206 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1206 may reside in the processing system 1214, external to the processing system 1214, or distributed across multiple entities including the processing system 1214. The computer-readable medium 1206 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 1204 may include circuitry configured for various functions, including, for example, NR-LTE coexistence in a V2X network. For example, the circuitry may be configured to implement one or more of the functions described below in relation to FIGS. 13 and 14.

In some aspects of the disclosure, the processor 1204 may include communication and processing circuitry 1240 configured for various functions, including for example communicating with a network core (e.g., a 5G core network), scheduled entities (e.g., UE), or any other entity, such as, for example, local infrastructure or an entity communicating with the wireless communication device 1200 via the Internet, such as a network provider. In some examples, the communication and processing circuitry 1240 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1240 may include one or more transmit/receive chains. In addition, the communication and processing circuitry 1240 may be configured to transmit and process uplink traffic and uplink control messages, receive and process downlink traffic and downlink control messages. In some examples, the communication and processing circuitry 1240 may be configured to transmit/receive and process sidelink traffic and control messages (e.g., V2X communication). The communication and processing circuitry 1240 may further be configured to execute communication and processing software 1250 stored on the computer-readable medium 1206 to implement one or more functions described herein.

In some implementations where the communication involves receiving information, the communication and processing circuitry 1240 may obtain information from a component of the wireless communication device 1200 (e.g., from the transceiver 1210 that receives the information via radio frequency signaling or some other type of signaling suitable for the applicable communication medium), process (e.g., decode) the information, and output the processed information. For example, the communication and processing circuitry 1240 may output the information to another component of the processor 1204, to the memory 1205, or to the bus interface 1208. In some examples, the communication and processing circuitry 1240 may receive one or more of signals, messages, other information, or any combination thereof. In some examples, the communication and processing circuitry 1240 may receive information via one or more channels. In some examples, the communication and processing circuitry 1240 may include functionality for a means for receiving. In some examples, the communication and processing circuitry 1240 may include functionality for a means for processing, including a means for demodulating, a means for decoding, etc.

In some implementations where the communication involves sending (e.g., transmitting) information, the communication and processing circuitry 1240 may obtain information (e.g., from another component of the processor 1204, the memory 1205, or the bus interface 1208), process (e.g., modulate, encode, etc.) the information, and output the processed information. For example, the communication and processing circuitry 1240 may output the information to the transceiver 1210 (e.g., that transmits the information via radio frequency signaling or some other type of signaling suitable for the applicable communication medium). In some examples, the communication and processing circuitry 1240 may send one or more of signals, messages, other information, or any combination thereof. In some examples, the communication and processing circuitry 1240 may send information via one or more channels. In some examples, the communication and processing circuitry 1240 may include functionality for a means for sending (e.g., a means for transmitting). In some examples, the communication and processing circuitry 1240 may include functionality for a means for generating, including a means for modulating, a means for encoding, etc.

In some aspects of the disclosure, the processor 1204 may include RAT determination circuitry 1242 configured for various functions, including for example determining, estimating, measuring, and updating an NR penetration rate (e.g., a unified NR penetration rate) to reduce the mismatch of NR penetration rates between V2X devices. The RAT determination circuitry 1242 can be configured to estimate an NR penetration rate based on the capability (NR or LTE capable) of other nearby V2X devices. The RAT determination circuitry 1242 can determine a unified NR penetration rate based on NR penetration rates received or forwarded from other V2X devices. The NR penetration rates 1215 received from other V2X devices may be stored in the memory 1205. The RAT determination circuitry 1242 may further be configured to execute NR penetration determination software 1252 stored on the computer-readable medium 1206 to implement one or more functions described herein.

In some aspects of the disclosure, the processor 1204 may include V2X resource circuitry 1244. The V2X resource circuitry 1244 may be configured for various functions, including for example, selecting a resource pool frame structure for NR-LTE coexistence in a V2X network based on an NR penetration rate. The resource pool frame structure partitions V2X communication resources into LTE and NR resources using time-multiplexing and/or frequency-multiplexing. The V2X resource circuitry 1244 can adjust the resource pool frame structure based on the latest unified NR penetration rate estimation. The V2X resource circuitry 1244 may further be configured to execute V2X resource software 1254 stored on the computer-readable medium 1206 to implement one or more functions described herein.

Figure 13:
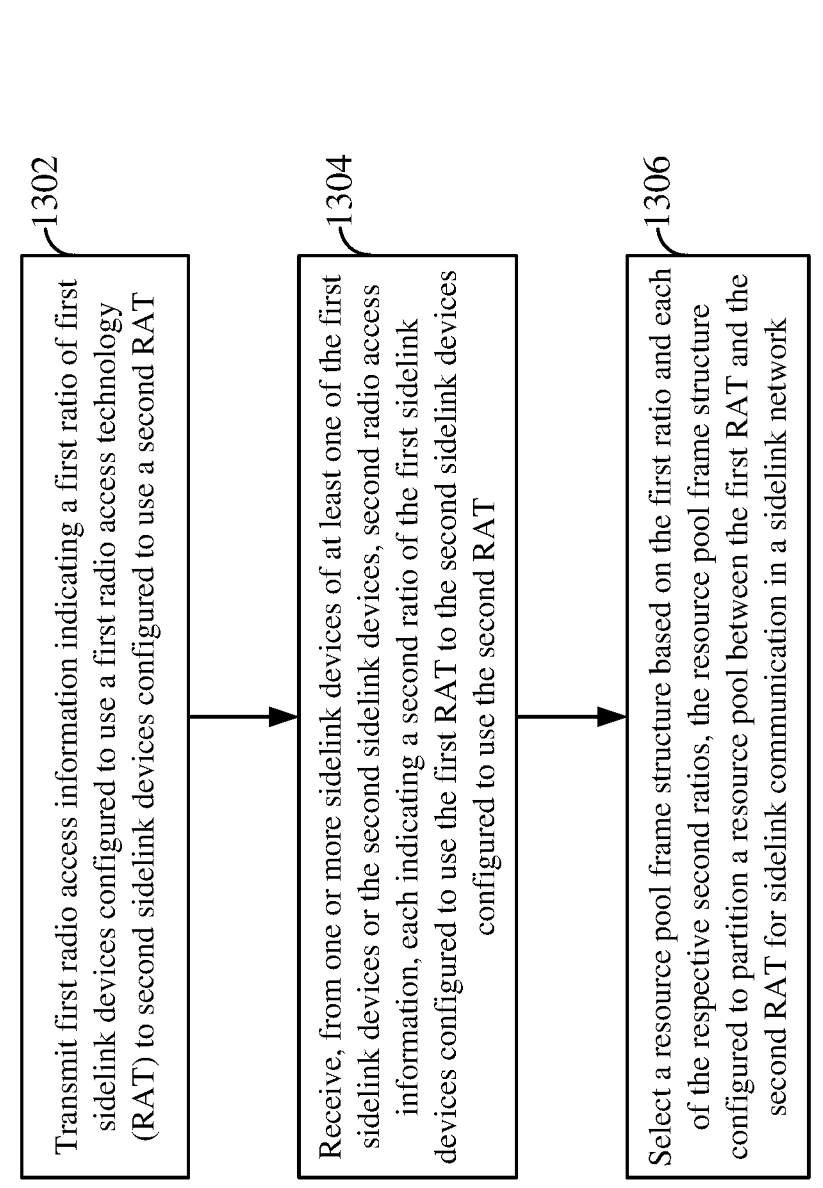
FIG. 13 is a flow chart illustrating an exemplary process for coordinated multiple RAT coexistence in a V2X communication network according to some aspects.

FIG. 13 is a flow chart illustrating an exemplary process 1300 for coordinated NR-LTE coexistence in a sidelink communication network according to some aspects. As described below, some or all illustrated features may be omitted in a particular implementation within the scope of the present disclosure, and some illustrated features may not be required for all implementations. In some examples, the process 1300 may be carried out by the wireless communication device 1200 illustrated in FIG. 12. In some examples, the process 1300 may be carried out by any suitable apparatus or means for carrying out the functions or algorithm described below.

At block 1302, a UE can transmit first radio access information indicating a first ratio of first sidelink devices configured to use a first RAT to second sidelink devices configured to use a second RAT. In one example, the first RAT may be NR, and the second RAT may be LTE. The first radio access information may include an NR penetration rate that indicates respective NR sidelink devices and LTE sidelink devices sharing a sidelink resource pool (e.g., pool frame structure 600) for sidelink communication. In one example, the first and second sidelink devices may include the NR V2X devices 502 and LTE V2X devices 504 described in FIG. 5. The UE may be one of the V2X devices of FIG. 5.

In one aspect, the communication and processing circuitry 1240 can provide a means to transmit the first radio access information via the transceiver 1210 and antenna array 1211. The UE may transmit the first ratio access information (e.g., NR penetration rate) using sidelink MAC CE and/or SCI (e.g., SCI-2). In one aspect, the RAT determination circuitry 1242 can provide a means to determine the first radio access information (e.g., NR penetration rate). For example, the first radio access information may include an NR penetration rate that can be determined based on the RAT capability (e.g., NR or LTE) of nearby sidelink devices. For example, the UE can determine the NR or LTE capability of a nearby sidelink device based on the LTE SL control information or sidelink MAC CE indicating the device being capable of NR and/or LTE. In another example, the UE can determine the radio access information (e.g., NR penetration rate) based on a channel busy ratio (CBR) or by determining resource reservation through control and data decoding (for both NR and LTE V2X communication) of sidelink traffic.

At block 1304, the UE can receive, from one or more sidelink devices of at least one of the first sidelink devices or the second sidelink devices, second radio access information, each indicating a respective second ratio of the first sidelink devices configured to use the first RAT to the second sidelink devices configured to use the second RAT. In one aspect, the communication and processing circuitry 1240 can provide a means to receive the second radio access information (e.g., NR penetration rate) via the transceiver 1210 and antenna array 1211. The UE may receive the second ratio access information (e.g., NR penetration rate) using sidelink MAC CE and/or SCI (e.g., SCI-2) from one or more of the sidelink devices.

At block 1306, the UE can select a resource pool frame structure based on the first ratio and each of the respective second ratios, the resource pool frame structure configured to partition a resource pool (e.g., RBs 208) between the first RAT and the second RAT for sidelink communication in a sidelink network. In one aspect, the V2X resource circuitry 1244 can provide a means to select the resource pool frame structure, for example, the resource pool frame structure 600 described above in relation to FIG. 6. For example, the UE can select the resource pool frame structure that divides or partitions resources between NR and LTE sidelink communication. The UE can use a unified NR penetration rate based on the first ratio and the second ratio to improve NR sidelink devices and LTE sidelink devices coexistence.

In one aspect, the UE can adjust the first ratio by averaging the first ratio and the second ratio. For example, the UE can adjust the first ratio by averaging the first ratio and a weighted second ratio. The UE can determine the weighted second ratio based on a distance between the UE and a sidelink device associated with the second ratio, a signal quality associated with the second ratio, and/or a group subscription associated with the second ratio. In one example, the UE can transmit third radio access information to forward the first ratio and second ratio to one or more sidelink devices. The third penetration rate information can include location information of a sidelink device associated with the second ratio, a signal quality associated with the second ratio, a hop count associated with the second ratio, or link information associated with the second ratio.

Figure 14:
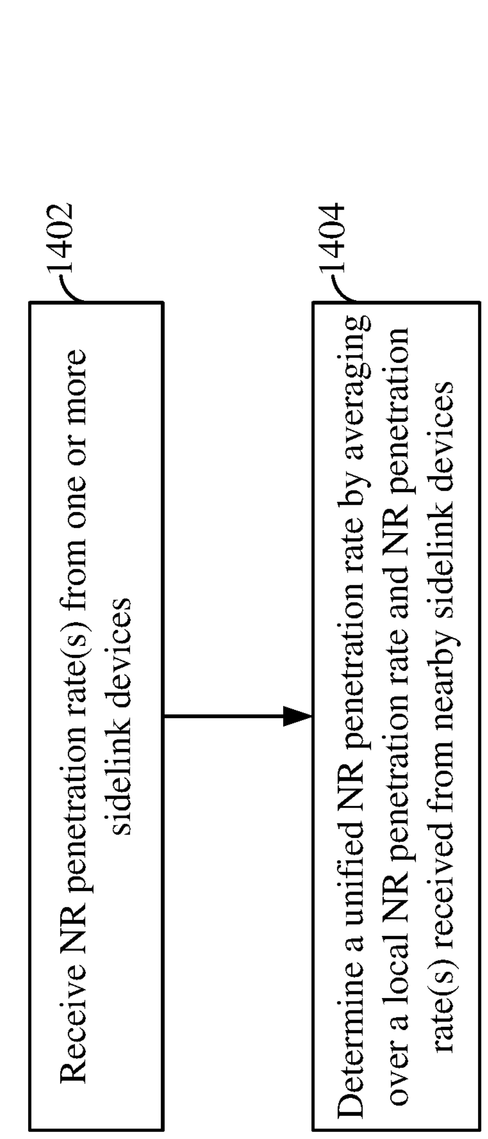
FIG. 14 is a flow chart illustrating an exemplary process for determining a unified NR penetration rate according to some aspects.

FIG. 14 is a flow chart illustrating an exemplary process 1400 for determining a unified NR penetration rate according to some aspects. As described below, some or all illustrated features may be omitted in a particular implementation within the scope of the present disclosure, and some illustrated features may not be required for all implementations. In some examples, the process 1400 may be carried out by the wireless communication device 1200 (e.g., UE) illustrated in FIG. 12. In some examples, the process 1400 may be carried out by any suitable apparatus or means for carrying out the functions or algorithm described below.

At block 1402, a UE can receive NR penetration information from one or more sidelink devices nearby. For example, the UE may be an NR V2X device 502 (see FIG. 5) that receives an NR penetration rate from each V2X device in an area 504. In one aspect, the communication and processing circuitry 1240 can provide a means to receive the NR penetration information via the transceiver 1210 and antenna array 1211. At block 1404, the UE can determine a unified NR penetration rate by averaging over a local NR penetration rate and NR penetration rate(s) received from nearby sidelink devices. For example, the RAT determination circuitry 1242 can provide a means to estimate the unified NR penetration rate based on the local NR penetration rate and NR penetration rate(s) received from nearby sidelink devices. In one aspect, the UE can select a resource pool frame structure (e.g., block 1306 of FIG. 13) using the unified NR penetration rate.

In one configuration, the wireless communication device 1200 includes means for sidelink communication and coexistence between sidelink devices using different RATs (e.g., NR and LTE). In one aspect, the aforementioned means may be the processor 1204 shown in FIG. 12 configured to perform the functions recited by the aforementioned means. In another aspect, the aforementioned means may be a circuit or any apparatus configured to perform the functions recited by the aforementioned means.

Of course, in the above examples, the circuitry included in the processor 1204 is merely provided as an example, and other means for carrying out the described functions may be included within various aspects of the present disclosure, including but not limited to the instructions stored in the computer-readable storage medium 1206, or any other suitable apparatus or means described in any one of the FIGS.

1, 3-5, and/or 7, and utilizing, for example, the processes and/or algorithms described herein in relation to FIGS. 13 and 14.

A first aspect provides a user equipment (UE) for wireless communication. The UE comprises: a transceiver; a memory; and a processor coupled to the memory and the transceiver, wherein the processor and the memory are configured to: transmit first radio access information indicating a first ratio of first sidelink devices configured to use a first radio access technology (RAT) to second sidelink devices configured to use a second RAT; receive, from one or more sidelink devices of at least one of the first sidelink devices or the second sidelink devices, second radio access information, each indicating a respective second ratio of the first sidelink devices configured to use the first RAT to the second sidelink devices configured to use the second RAT; and select a resource pool frame structure based on the first ratio and each of the respective second ratios, the resource pool frame structure configured to partition a resource pool between the first RAT and the second RAT for sidelink communication in a sidelink network.

In a second aspect, alone or in combination with the first aspect, wherein the processor and the memory are further configured to: transmit the first radio access information by at least one of: a sidelink medium access control (MAC) control element (CE); or sidelink control information.

In a third aspect, alone or in combination with the first aspect, wherein the processor and the memory are further configured to: transmit the first radio access information in response to a time-lapse from a previous transmission of a previous first radio access information is greater than a predetermined threshold.

In a fourth aspect, alone or in combination with the first aspect, wherein the processor and the memory are further configured to: transmit the first radio access information in response to a change in the first ratio being greater than a predetermined threshold since a previous transmission of a previous first radio access information.

In a fifth aspect, alone or in combination with any of the first to fourth aspects, wherein the processor and the memory are further configured to:

transmit the first radio access information in at least one of a sidelink transmission comprising payload data or a stand-alone sidelink transmission comprising no payload data.

In a sixth aspect, alone or in combination with the fifth aspect, wherein the processor and the memory are further configured to: transmit the first radio access information in the sidelink transmission comprising payload data or the stand-alone sidelink transmission based on a traffic pattern in the sidelink network.

In a seventh aspect, alone or in combination with any of the first to fourth aspects, wherein the processor and the memory are further configured to adjust the first ratio by averaging the first ratio and each of the respective second ratios.

In an eighth aspect, alone or in combination with the seventh aspect, wherein each of the respective second ratios is weighted based on at least one of: a distance between the UE and a sidelink device of the one or more sidelink devices associated with the respective second ratio; a signal quality associated with the respective second ratio; or a group subscription associated with the respective second ratio.

In a ninth aspect, alone or in combination with any of the first to fourth aspects, wherein the processor and the memory are further configured to transmit third radio access information to forward a second ratio of the respective second ratios to one or more other sidelink devices, wherein the third radio access information comprises at least one of: location information of a sidelink device of the one or more sidelink devices associated with the second ratio; a signal quality associated with the second ratio; a hop count associated with the second ratio; or link information associated with the second ratio.

A tenth aspect provides a method for wireless communication at a user equipment (UE). The method comprises: transmitting first radio access information indicating a first ratio of first sidelink devices configured to use a first radio access technology (RAT) to second sidelink devices configured to use a second RAT; receiving, from one or more sidelink devices of at least one of the first sidelink devices or the second sidelink devices, second radio access information, each indicating a respective second ratio of the first sidelink devices configured to use the first RAT to the second sidelink devices configured to use the second RAT; and selecting a resource pool frame structure based on the first ratio and each of the respective second ratios, the resource pool frame structure configured to partition a resource pool between the first RAT and the second RAT for sidelink communication in a sidelink network.

In an eleventh aspect, alone or in combination with the tenth aspect, the method further comprises: transmitting the first radio access information by at least one of: a sidelink medium access control (MAC) control element (CE); or sidelink control information.

In a twelfth aspect, alone or in combination with the tenth aspect, the method further comprises: transmitting the first radio access information in response to a time-lapse from a previous transmission of a previous first radio access information is greater than a predetermined threshold.

In a thirteenth aspect, alone or in combination with the tenth aspect, the method further comprises: transmitting the first radio access information in response to a change in the first ratio being greater than a predetermined threshold since a previous transmission of a previous first radio access information.

In a fourteenth aspect, alone or in combination with any of the tenth to thirteenth aspects, the method further comprises: transmitting the first radio access information in at least one of a sidelink transmission comprising payload data or a stand-alone sidelink transmission comprising no payload data.

In a fifteenth aspect, alone or in combination with the fourteenth aspect, the method further comprises: transmitting the first radio access information in the sidelink transmission comprising payload data or the stand-alone sidelink transmission based on a traffic pattern in the sidelink network.

In a sixteenth aspect, alone or in combination with any of the tenth to thirteenth aspects, the method further comprises: adjusting the first ratio by averaging the first ratio and each of the respective second ratios.

In a seventeenth aspect, alone or in combination with the sixteenth aspect, wherein each of the respective second ratios is weighted based on at least one of: a distance between the UE and a sidelink device of the one or more sidelink devices associated with the respective second ratio; a signal quality associated with the respective second ratio; or a group subscription associated with the respective second ratio.

In an eighteenth aspect, alone or in combination with any of the tenth to thirteenth aspects, the method further comprises: transmitting third radio access information to forward a second ratio of the respective second ratios to one or more other sidelink devices, wherein the third radio access information comprises at least one of: location information of a sidelink device of the one or more sidelink devices associated with the second ratio; a signal quality associated with the second ratio; a hop count associated with the second ratio; or link information associated with the second ratio.

A nineteenth aspect provides a user equipment (UE) for wireless communication. The UE comprises: means for transmitting first radio access information indicating a first ratio of first sidelink devices configured to use a first radio access technology (RAT) to second sidelink devices configured to use a second RAT; means for receiving, from one or more sidelink devices of at least one of the first sidelink devices or the second sidelink devices, second radio access information, each indicating a respective second ratio of the first sidelink devices configured to use the first RAT to the second sidelink devices configured to use the second RAT; and means for selecting a resource pool frame structure based on the first ratio and each of the respective second ratios, the resource pool frame structure configured to partition a resource pool between the first RAT and the second RAT for sidelink communication in a sidelink network.

In a twentieth aspect, alone or in combination with the nineteenth aspect, wherein the means for transmitting the first radio access information is configured to: transmit the first radio access information in response to a time-lapse from a previous transmission of a previous first radio access information is greater than a predetermined threshold; or transmit the first radio access information in response to a change in the first ratio being greater than a predetermined threshold since a previous transmission of a previous first radio access information.

In a twenty-first aspect, alone or in combination with any of the nineteenth to twentieth aspects, wherein the means for transmitting the first radio access information is configured to: transmit the first radio access information in at least one of a sidelink transmission comprising payload data or a stand-alone sidelink transmission comprising no payload data, based on a traffic pattern in the sidelink network.

In a twenty-second aspect, alone or in combination with any of the nineteenth to twentieth aspects, the UE further comprises: means for adjusting the first ratio by averaging the first ratio and each of the respective second ratios.

In a twenty-third aspect, alone or in combination with the twenty-second aspect, wherein each of the respective second ratios is weighted based on at least one of: a distance between the UE and a sidelink device of the one or more sidelink devices associated with the respective second ratio; a signal quality associated with the respective second ratio; or a group subscription associated with the respective second ratio.

In a twenty-fourth aspect, alone or in combination with any of the nineteenth to twentieth aspects, the UE further comprises: means for transmitting third radio access information to forward a second ratio of the respective second ratios to one or more other sidelink devices, wherein the third radio access information comprises at least one of: location information of a sidelink device of the one or more sidelink devices associated with the second ratio; a signal quality associated with the second ratio; a hop count associated with the second ratio; or link information associated with the second ratio.

A twenty-fifth aspect provides a computer-readable storage medium storing computer executable code. The executable code comprises instructions causing a user equipment (UE) to: transmit first radio access information indicating a first ratio of first sidelink devices configured to use a first radio access technology (RAT) to second sidelink devices configured to use a second RAT; receive, from one or more sidelink devices of at least one of the first sidelink devices or the second sidelink devices, second radio access information, each indicating a respective second ratio of the first sidelink devices configured to use the first RAT to the second sidelink devices configured to use the second RAT; and select a resource pool frame structure based on the first ratio and each of the respective second ratios, the resource pool frame structure configured to partition a resource pool between the first RAT and the second RAT for sidelink communication in a sidelink network.

In a twenty-sixth aspect, alone or in combination with the twenty-fifth aspect, the computer-readable storage medium further comprises instructions causing the UE to: transmit the first radio access information in response to a time-lapse from a previous transmission of a previous first radio access information is greater than a predetermined threshold; or transmit the first radio access information in response to a change in the first ratio being greater than a predetermined threshold since a previous transmission of a previous first radio access information.

In a twenty-seventh aspect, alone or in combination with any of the twenty-fifth to twenty-sixth aspects, the computer-readable storage medium further comprises instructions causing the UE to: transmit the first radio access information in at least one of a sidelink transmission comprising payload data or a stand-alone sidelink transmission comprising no payload data, based on a traffic pattern in the sidelink network.

In a twenty-eighth aspect, alone or in combination with any of the twenty-fifth to twenty-sixth aspects, the computer-readable storage medium further comprises instructions causing the UE to: adjust the first ratio by averaging the first ratio and each of the respective second ratios.

In a twenty-ninth aspect, alone or in combination with the twenty-eighth aspect, wherein each of the respective second ratios is weighted based on at least one of: a distance between the UE and a sidelink device of the one or more sidelink devices associated with the respective second ratio; a signal quality associated with the respective second ratio; or a group subscription associated with the respective second ratio.

In a thirtieth aspect, alone or in combination with any of the twenty-fifth to twenty-sixth aspects, the computer-readable storage medium further comprises instructions causing the UE to: transmit third radio access information to forward a second ratio of the respective second ratios to one or more other sidelink devices, wherein the third radio access information comprises at least one of: location information of a sidelink device of the one or more sidelink devices associated with the second ratio; a signal quality associated with the second ratio; a hop count associated with the second ratio; or link information associated with the second ratio.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-14 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-14 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A user equipment (UE) for wireless communication, comprising:

a transceiver;

a memory; and a processor coupled to the memory and the transceiver, wherein the processor and the memory are configured to:

transmit first radio access information indicating a first ratio of first sidelink devices configured to use a first radio access technology (RAT) to second sidelink devices configured to use a second RAT;

receive, from one or more sidelink devices of at least one of the first sidelink devices or the second sidelink devices, second radio access information, each indicating a respective second ratio of the first sidelink devices configured to use the first RAT to the second sidelink devices configured to use the second RAT; and select a resource pool frame structure based on the first ratio and each of the respective second ratios, the resource pool frame structure configured to partition a resource pool between the first RAT and the second RAT for sidelink communication in a sidelink network.

2. The UE of claim 1, wherein the processor and the memory are further configured to:

transmit the first radio access information by at least one of:

a sidelink medium access control (MAC) control element (CE); or sidelink control information.

3. The UE of claim 1, wherein the processor and the memory are further configured to:

transmit the first radio access information in response to a time-lapse from a previous transmission of a previous first radio access information is greater than a predetermined threshold.

4. The UE of claim 1, wherein the processor and the memory are further configured to:

transmit the first radio access information in response to a change in the first ratio being greater than a predetermined threshold since a previous transmission of a previous first radio access information.

5. The UE of claim 1, wherein the processor and the memory are further configured to:

transmit the first radio access information in at least one of a sidelink transmission comprising payload data or a stand-alone sidelink transmission comprising no payload data.

6. The UE of claim 5, wherein the processor and the memory are further configured to:

transmit the first radio access information in the sidelink transmission comprising payload data or the stand-alone sidelink transmission based on a traffic pattern in the sidelink network.

7. The UE of claim 1, wherein the processor and the memory are further configured to adjust the first ratio by averaging the first ratio and each of the respective second ratios.

8. The UE of claim 7, wherein each of the respective second ratios is weighted based on at least one of:

a distance between the UE and a sidelink device of the one or more sidelink devices associated with the respective second ratio;

a signal quality associated with the respective second ratio; or a group subscription associated with the respective second ratio.

9. The UE of claim 1, wherein the processor and the memory are further configured to transmit third radio access information to forward a second ratio of the respective second ratios to one or more other sidelink devices, wherein the third radio access information comprises at least one of:

location information of a sidelink device of the one or more sidelink devices associated with the second ratio;

a signal quality associated with the second ratio;

a hop count associated with the second ratio; or link information associated with the second ratio.

10. A method for wireless communication at a user equipment (UE), comprising:

transmitting first radio access information indicating a first ratio of first sidelink devices configured to use a first radio access technology (RAT) to second sidelink devices configured to use a second RAT;

receiving, from one or more sidelink devices of at least one of the first sidelink devices or the second sidelink devices, second radio access information, each indicating a respective second ratio of the first sidelink devices configured to use the first RAT to the second sidelink devices configured to use the second RAT; and selecting a resource pool frame structure based on the first ratio and each of the respective second ratios, the resource pool frame structure configured to partition a resource pool between the first RAT and the second RAT for sidelink communication in a sidelink network.

11. The method of claim 10, further comprising:

transmitting the first radio access information by at least one of:

a sidelink medium access control (MAC) control element (CE); or sidelink control information.

12. The method of claim 10, further comprising:

transmitting the first radio access information in response to a time-lapse from a previous transmission of a previous first radio access information is greater than a predetermined threshold.

13. The method of claim 10, further comprising:

transmitting the first radio access information in response to a change in the first ratio being greater than a predetermined threshold since a previous transmission of a previous first radio access information.

14. The method of claim 10, further comprising:

transmitting the first radio access information in at least one of a sidelink transmission comprising payload data or a stand-alone sidelink transmission comprising no payload data.

15. The method of claim 14, further comprising:

transmitting the first radio access information in the sidelink transmission comprising payload data or the stand-alone sidelink transmission based on a traffic pattern in the sidelink network.

16. The method of claim 10, further comprising:

adjusting the first ratio by averaging the first ratio and each of the respective second ratios.

17. The method of claim 16, wherein each of the respective second ratios is weighted based on at least one of:

a distance between the UE and a sidelink device of the one or more sidelink devices associated with the respective second ratio;

a signal quality associated with the respective second ratio; or a group subscription associated with the respective second ratio.

18. The method of claim 10, further comprising:

transmitting third radio access information to forward a second ratio of the respective second ratios to one or more other sidelink devices, wherein the third radio access information comprises at least one of:

location information of a sidelink device of the one or more sidelink devices associated with the second ratio;

a signal quality associated with the second ratio;

a hop count associated with the second ratio; or link information associated with the second ratio.

19. A user equipment (UE) for wireless communication, comprising:

means for transmitting first radio access information indicating a first ratio of first sidelink devices configured to use a first radio access technology (RAT) to second sidelink devices configured to use a second RAT;

means for receiving, from one or more sidelink devices of at least one of the first sidelink devices or the second sidelink devices, second radio access information, each indicating a respective second ratio of the first sidelink devices configured to use the first RAT to the second sidelink devices configured to use the second RAT; and means for selecting a resource pool frame structure based on the first ratio and each of the respective second ratios, the resource pool frame structure configured to partition a resource pool between the first RAT and the second RAT for sidelink communication in a sidelink network.

20. The UE of claim 19, wherein the means for transmitting the first radio access information is configured to:

transmit the first radio access information in response to a time-lapse from a previous transmission of a previous first radio access information is greater than a predetermined threshold; or transmit the first radio access information in response to a change in the first ratio being greater than a predetermined threshold since a previous transmission of a previous first radio access information.

21. The UE of claim 19, wherein the means for transmitting the first radio access information is configured to:

transmit the first radio access information in at least one of a sidelink transmission comprising payload data or a stand-alone sidelink transmission comprising no payload data, based on a traffic pattern in the sidelink network.

22. The UE of claim 19, further comprising:

means for adjusting the first ratio by averaging the first ratio and each of the respective second ratios.

23. The UE of claim 22, wherein each of the respective second ratios is weighted based on at least one of:

a distance between the UE and a sidelink device of the one or more sidelink devices associated with the respective second ratio;

a signal quality associated with the respective second ratio; or a group subscription associated with the respective second ratio.

24. The UE of claim 19, further comprising:

means for transmitting third radio access information to forward a second ratio of the respective second ratios to one or more other sidelink devices, wherein the third radio access information comprises at least one of:

location information of a sidelink device of the one or more sidelink devices associated with the second ratio;

a signal quality associated with the second ratio;

a hop count associated with the second ratio; or link information associated with the second ratio.

25. A non-transitory computer-readable storage medium storing computer executable code, comprising instructions causing a user equipment (UE) to:

transmit first radio access information indicating a first ratio of first sidelink devices configured to use a first radio access technology (RAT) to second sidelink devices configured to use a second RAT;

receive, from one or more sidelink devices of at least one of the first sidelink devices or the second sidelink devices, second radio access information, each indicating a respective second ratio of the first sidelink devices configured to use the first RAT to the second sidelink devices configured to use the second RAT; and select a resource pool frame structure based on the first ratio and each of the respective second ratios, the resource pool frame structure configured to partition a resource pool between the first RAT and the second RAT for sidelink communication in a sidelink network.

26. The non-transitory computer-readable storage medium of claim 25, further comprising instructions causing the UE to:

transmit the first radio access information in response to a time-lapse from a previous transmission of a previous first radio access information is greater than a predetermined threshold; or transmit the first radio access information in response to a change in the first ratio being greater than a predetermined threshold since a previous transmission of a previous first radio access information.

27. The non-transitory computer-readable storage medium of claim 25, further comprising instructions causing the UE to:

transmit the first radio access information in at least one of a sidelink transmission comprising payload data or a stand-alone sidelink transmission comprising no payload data, based on a traffic pattern in the sidelink network.

28. The non-transitory computer-readable storage medium of claim 25, further comprising instructions causing the UE to:

adjust the first ratio by averaging the first ratio and each of the respective second ratios.

29. The non-transitory computer-readable storage medium of claim 28, wherein each of the respective second ratios is weighted based on at least one of:

a distance between the UE and a sidelink device of the one or more sidelink devices associated with the respective second ratio;

a signal quality associated with the respective second ratio; or a group subscription associated with the respective second ratio.

30. The non-transitory computer-readable storage medium of claim 25, further comprising instructions causing the UE to:

transmit third radio access information to forward a second ratio of the respective second ratios to one or more other sidelink devices, wherein the third radio access information comprises at least one of:

location information of a sidelink device of the one or more sidelink devices associated with the second ratio;

a signal quality associated with the second ratio;

a hop count associated with the second ratio; or link information associated with the second ratio.

* * * * *